(12) United States Patent
Adams et al.

(10) Patent No.: US 9,955,632 B1
(45) Date of Patent: May 1, 2018

(54) METHOD AND APPARATUS FOR HORTICULTURAL LIGHTING TO BETTER SIMULATE THE SUN

(71) Applicant: Illum Technology, LLC, Mesa, AZ (US)

(72) Inventors: Stephen P. Adams, Mesa, AZ (US); Darin M. Carpenter, Las Vegas, NV (US)

(73) Assignee: Illum Horticulture LLC, Mesa, AZ (US)

( * ) Notice: Subject to any disclaimer, the term of this patent is extended or adjusted under 35 U.S.C. 154(b) by 0 days. days.

(21) Appl. No.: 15/784,683

(22) Filed: Oct. 16, 2017

Related U.S. Application Data

(63) Continuation-in-part of application No. 15/714,337, filed on Sep. 25, 2017.

(60) Provisional application No. 62/422,243, filed on Nov. 15, 2016, provisional application No. 62/399,447, filed on Sep. 25, 2016, provisional application No. 62/489,965, filed on Apr. 25, 2017.

(51) Int. Cl.
| | |
|---|---|
| *H05B 37/02* | (2006.01) |
| *A01G 7/04* | (2006.01) |
| *H05B 33/08* | (2006.01) |
| *A01G 9/20* | (2006.01) |
| *A01G 9/18* | (2006.01) |
| *A01G 9/24* | (2006.01) |

(52) U.S. Cl.
CPC ............... *A01G 7/045* (2013.01); *A01G 9/20* (2013.01); *H05B 33/0833* (2013.01); *H05B 33/0842* (2013.01); *H05B 33/0848* (2013.01); *H05B 33/0869* (2013.01); *A01G 9/18* (2013.01); *A01G 9/246* (2013.01)

(58) Field of Classification Search
CPC .................. H05B 33/0833; H05B 33/0848
USPC .... 315/151, 152, 153, 185 R, 291, 308, 309
See application file for complete search history.

(56) References Cited

U.S. PATENT DOCUMENTS

| | | | |
|---|---|---|---|
| 8,850,742 B2 | 10/2014 | Dube | |
| 9,713,223 B2 * | 7/2017 | Barron | ............... H05B 33/0869 |
| 9,763,298 B2 * | 9/2017 | Weeks, Jr. | ......... H05B 33/0827 |

(Continued)

FOREIGN PATENT DOCUMENTS

| | | |
|---|---|---|
| CN | 103162144 | 6/2013 |
| CN | 205664192 | 10/2016 |

(Continued)

*Primary Examiner* — Thuy Vinh Tran
(74) *Attorney, Agent, or Firm* — Michael T. Wallace

(57) ABSTRACT

A method and apparatus for a horticultural light for use in an indoor horticultural facility that produces broad spectrum white light with variable correlated color temperature (CCT) so as to better simulate various aspects of the sun, such as the multiple phases of the sun, aspects of the sun in all four seasons and latitude of the sun. One or more rows of fixed-color LEDs is used to obtain even wider ranges of CCT values, such as the use of red and/or blue LEDs. Even broader spectrums are achieved by utilizing LEDs that emit differing wavelengths within a particular color spectrum, such as a channel of red LEDs that emit two different wavelengths within the red spectrum and/or a channel of blue LEDs that emit two different wavelengths within the blue spectrum. Sensors with feedback control maintains the light within constraints defined by a light prescription database.

20 Claims, 17 Drawing Sheets

(56) References Cited

U.S. PATENT DOCUMENTS

| | | |
|---|---|---|
| 9,820,447 B2 | 11/2017 | Vilgiate |
| 2010/0287830 A1 | 11/2010 | Chen et al. |
| 2012/0043907 A1 | 2/2012 | Lu et al. |
| 2013/0139437 A1* | 6/2013 | Maxik .................... H05B 37/02 47/58.1 LS |
| 2014/0265868 A1* | 9/2014 | Morrisseau ........ H05B 33/0842 315/151 |
| 2017/0094756 A1* | 3/2017 | Saffari ............... H05B 37/0272 |
| 2017/0227174 A1* | 8/2017 | May ........................ F21K 9/278 |

FOREIGN PATENT DOCUMENTS

| | | |
|---|---|---|
| WO | WO2015154798 | 10/2015 |
| WO | WO2015184019 | 12/2015 |

* cited by examiner

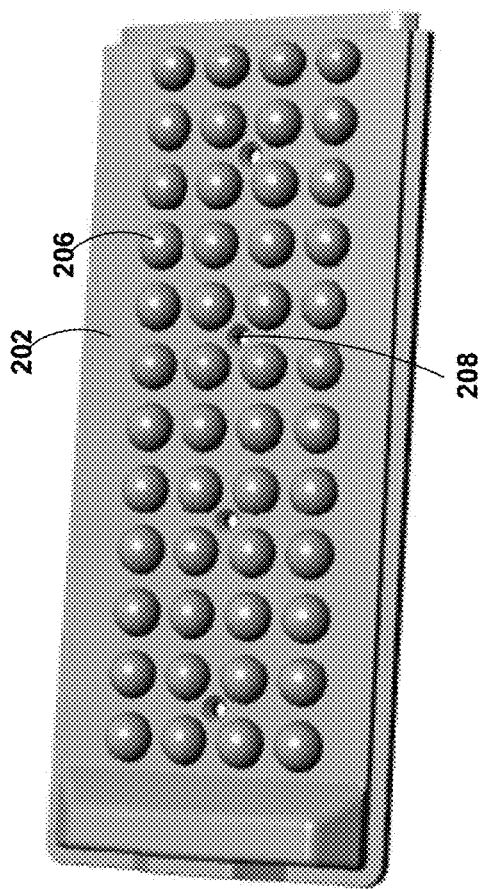
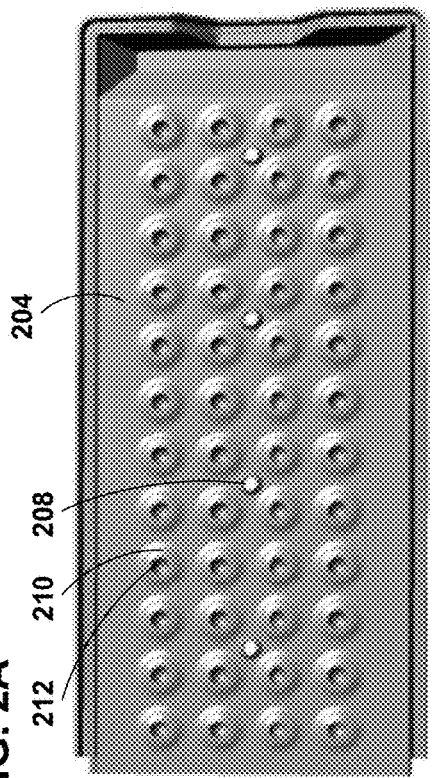
FIG. 2A
FIG. 2B

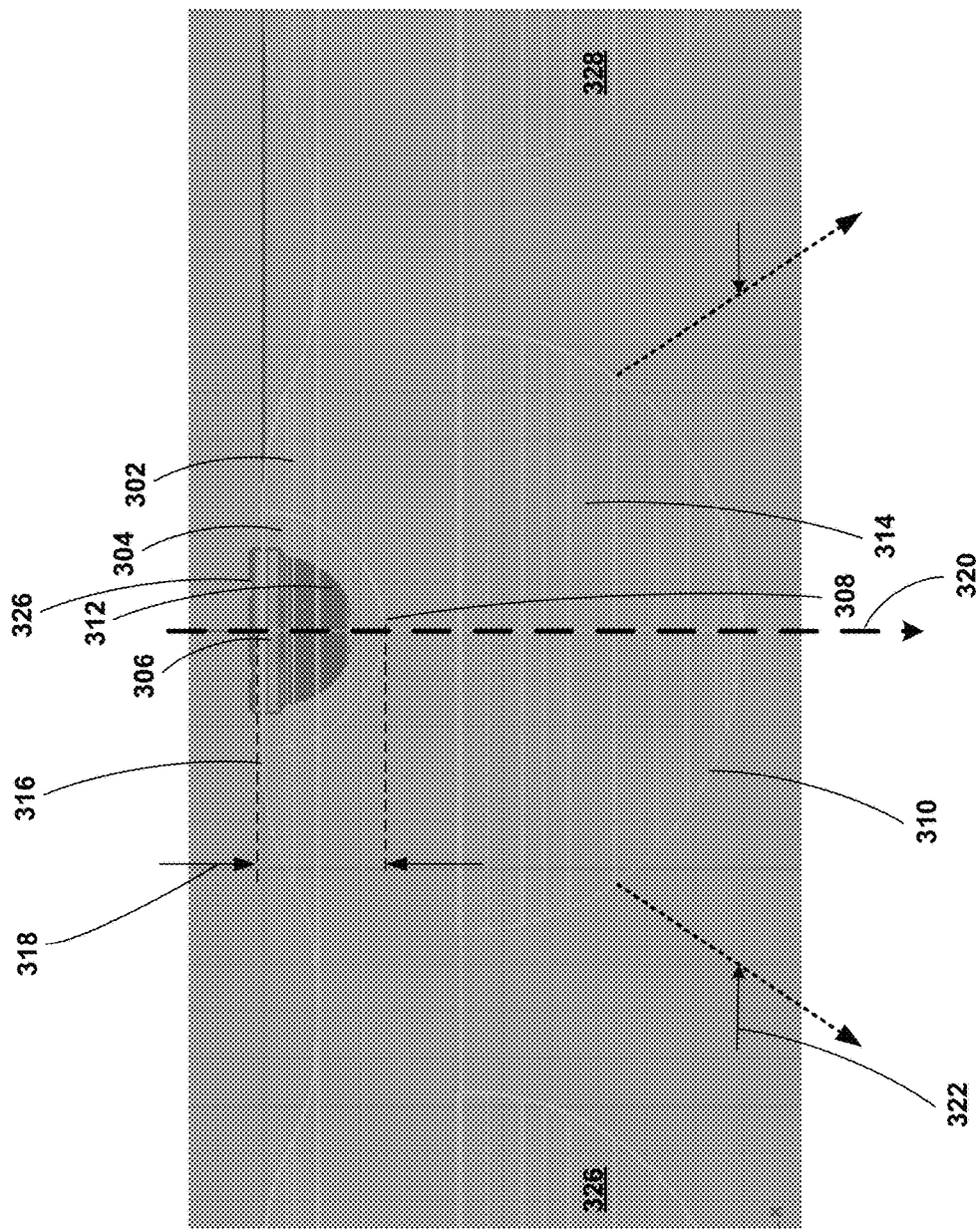

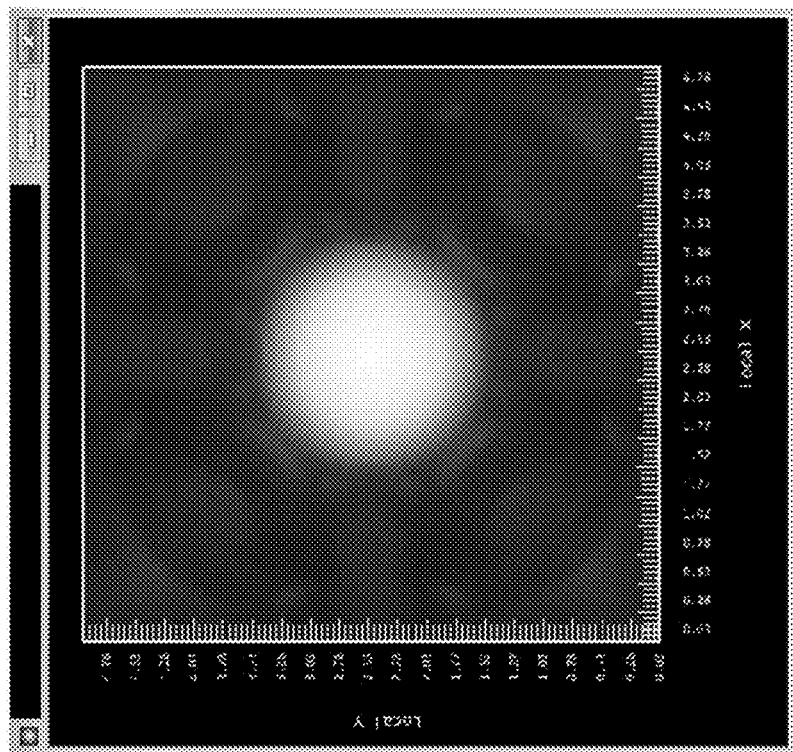
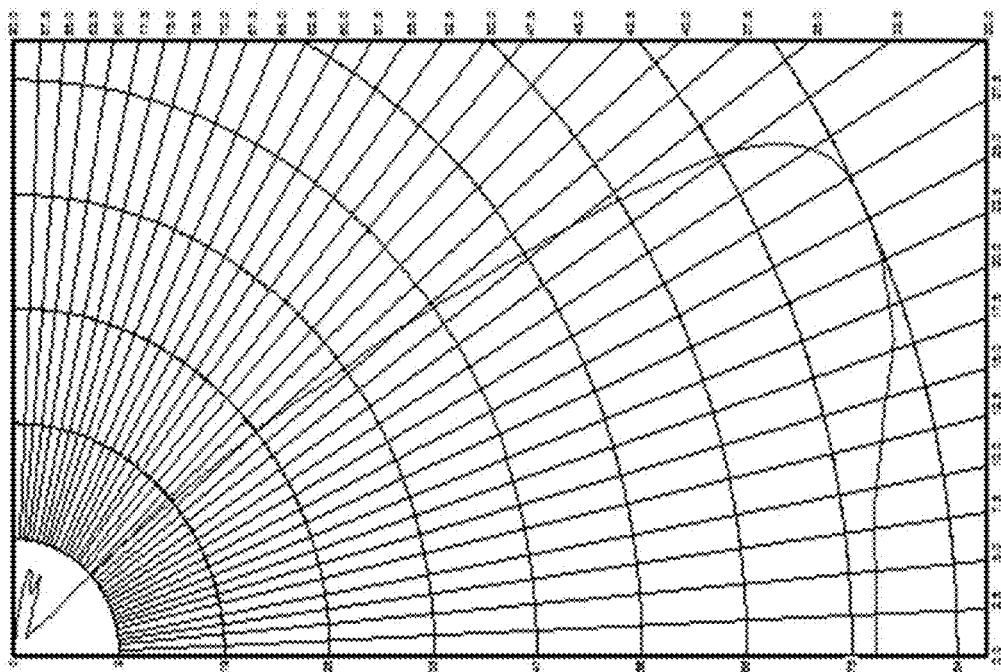
FIG. 4B
FIG. 4A

METHOD AND APPARATUS FOR HORTICULTURAL LIGHTING TO BETTER SIMULATE THE SUN

FIELD OF THE INVENTION

The present invention generally relates to horticultural lighting, and more particularly to horticultural lighting that better simulates the sun.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

LEDs exhibit significantly optimized characteristics, such as source efficacy, optical control and extremely long operating life, which make them excellent choices for general lighting applications. LED efficiencies, for example, may provide light output magnitudes up to 200 lumens per watt of power. Energy savings may, therefore, be realized when utilizing LED-based lighting systems as compared to the energy usage of, for example, incandescent, halogen, compact fluorescent and high-intensity discharge (HID) lighting systems. As per an example, an LED-based lighting fixture may utilize a small percentage (e.g., 15-20%) of the power utilized by a halogen-based lighting system, but may still produce an equivalent magnitude of light.

While HID lighting systems have been the predominant choice for conventional horticultural lighting applications, LED technologies are gaining attraction due to their high luminous efficacy and their ability to produce narrow-band spectral distributions. Current LED-based horticultural lighting systems, however, fail to produce adequate light uniformity for indoor horticulture facility applications where natural light is not present nor do they produce adaptable spectral tuning. In addition, conventional LED-based horticultural lighting systems produce light rays exhibiting decreased intensity with increasing emission angle relative to the optical axis. Accordingly, none of the control systems used to effect adequate light distribution characteristics, spectral tuning and power efficiency are in existence either.

Efforts continue, therefore, to develop an LED lighting system and associated controls that exceed the performance parameters of conventional horticultural lighting systems.

SUMMARY

To overcome limitations in the prior art, and to overcome other limitations that will become apparent upon reading and understanding the present specification, various embodiments of the present invention disclose methods and apparatus for the control and production of LED-based lighting for indoor horticultural systems that may exhibit specific light distribution having increased intensity as the beam angle increases with respect to the optical axis.

In accordance with one embodiment of the invention, a horticultural system comprises a light having a plurality of arrays of LEDs wherein each of the plurality of arrays of LEDs are configured in rows. The plurality of rows of LEDs includes a first row of broad-spectrum white LEDs exhibiting a first color temperature, a second row of broad-spectrum white LEDs exhibiting a second color temperature and one or more rows of fixed-color LEDs. The horticultural system further includes a controller coupled to each row of the plurality of rows of LEDs. Each row of LEDs is configured by the controller to produce a light spectrum exhibiting a third color temperature tunable between the first and second color temperatures. The horticultural system further includes a light prescription database coupled to the controller and a sensor coupled to the controller and configured to provide measurements indicative of the third color temperature. The controller is configured to control an intensity of the plurality of rows of LEDs to maintain the third color temperature within constraints defined by the light prescription database.

In accordance with an alternate embodiment of the invention, a horticultural system comprises a light having a plurality of rows of LEDs including a first row of broad-spectrum white LEDs exhibiting a first color temperature, a second row of broad-spectrum white LEDs exhibiting a second color temperature, a third row of broad-spectrum white LEDs exhibiting a third color temperature and a single row of fixed-color LEDs. The horticultural system further includes a controller coupled to each row of the plurality of rows of LEDs. An intensity of each row of LEDs is selected by the controller to produce a light spectrum exhibiting a fourth color temperature tunable between the first and third color temperatures.

In accordance with an alternate embodiment of the invention, a horticultural system comprises a light including multiple channels of LEDs, a controller coupled to each of the multiple channels of LEDs, the controller configured to adjust an intensity of light generated by each of the multiple channels of LEDs, a database coupled to the controller and a sensor coupled to the controller and configured to measure aspects of the generated light. The controller adapts the intensity of each of the multiple channels of LEDs to maintain the measured aspects of the light to be within a light prescription constraint defined by the database.

BRIEF DESCRIPTION OF THE DRAWINGS

Various aspects and advantages of the invention will become apparent upon review of the following detailed description and upon reference to the drawings in which:

FIGS. 2A and 2B illustrate a lens array in accordance with one embodiment of the present invention;

FIG. 3 illustrates a cross-section of an LED/lens pair in accordance with one embodiment of the present invention;

FIGS. 4A and 4B illustrate an intensity distribution and shaded illuminance plot in accordance with one embodiment of the present invention;

DETAILED DESCRIPTION

Figure 1:
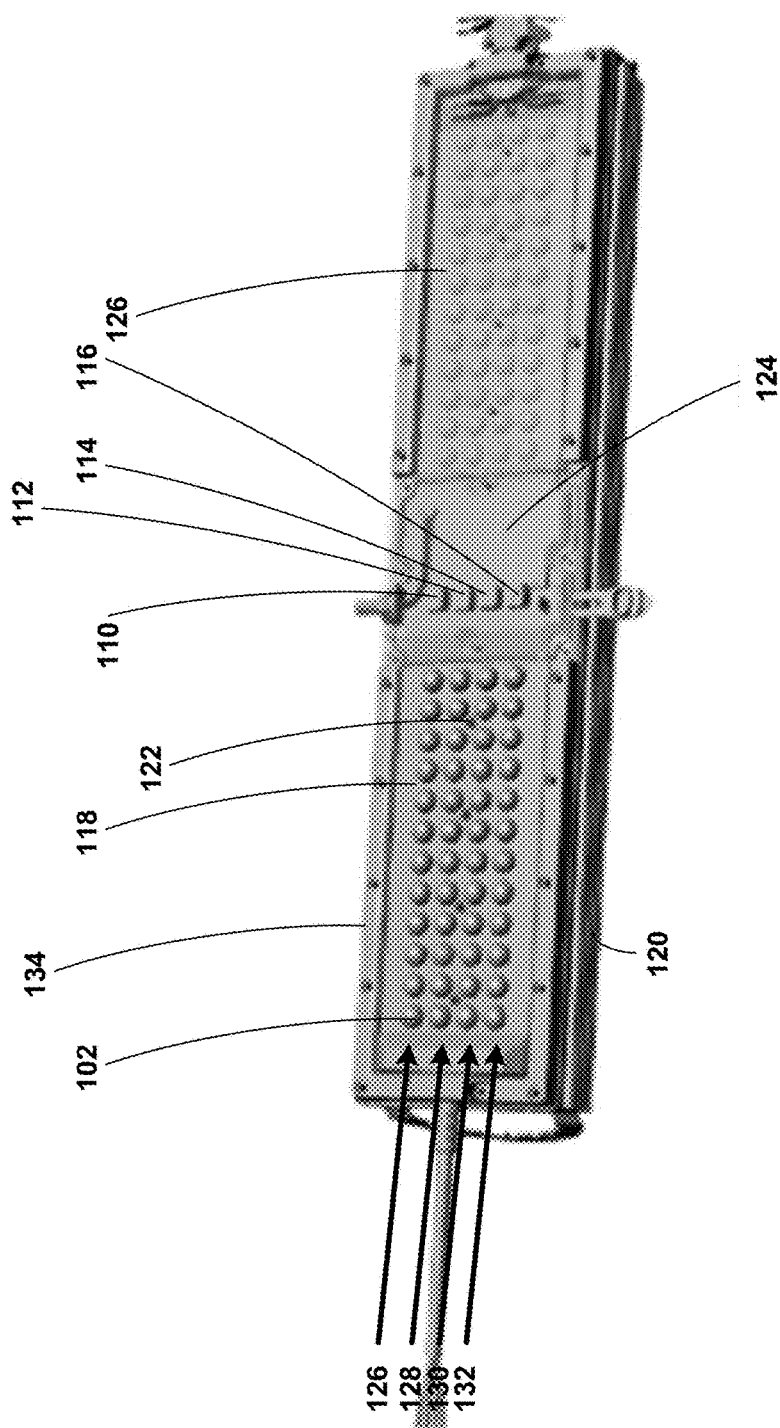
FIG. 1 illustrates an LED-based horticultural light in accordance with one embodiment of the present invention.

Generally, the various embodiments of the present invention are applied to a light emitting diode (LED) based lighting system that may contain an array of LEDs and an array of associated lenses. The LED array may be mechanically and electrically mounted to a PCB having control and bias circuitry that allows specific sets (e.g., channels or strings) of LEDs to be illuminated on command. Any set of one or more LEDs may be grouped into one or more channels, such that specific rows, columns or other arrangements of LEDs in the LED array may be illuminated independently depending upon the specific channel within which the LED or LEDs are grouped. A channel of LEDs may include non-linear arrangements, such as square, circular, rectangular, zig-zag or star-shaped arrangements to name only a few. An associated lens array may be mounted in proximity to the LED array in such a way that the lens array may perform more than one function. For example, the lens array may mechanically impose a uniform pressure onto the PCB against the associated heat sink to optimize heat transfer from the PCB to the heat sink. Further, the lens array may contain individual lenses with mechanical standoffs so as to maintain an optimal separation distance between the LED and associated lens so that light rays generated by each individual LED may be optically varied before projection onto a target.

The mechanical standoffs may, for example, exhibit a shape (e.g., circular) having a dimension (e.g., circumference) that is slightly larger than a dimension (e.g., a circumference) of the LED's footprint as mounted on its associated PCB. Accordingly, as the lens array is pressed against the PCB, each mechanical standoff of each lens of the lens array may impose a substantially uniform pressure along a circular perimeter surrounding the LED to further enhance heat transfer from the LED to the heat sink.

Each lens of the lens array may, for example, be placed in such proximity to its corresponding LED so as to collect substantially all of the light generated by its associated LED and virtually none of the light generated by neighboring LEDs. Each lens may optically vary (e.g., refract) the light distributed by its associated LED into an optically varied light distribution, such that the light distributed by the lens may exhibit a modified intensity distribution as compared to the intensity distribution of light generated by a bare LED. In alternate embodiments, multiple LEDs may be associated with a single lens such that the intensity of light generated by each of the multiple LEDs may be modified by the single lens.

The Full Width Half Maximum (FWHM) beam angle may be defined as the beam angle where the light distribution exhibits an intensity equal to half the peak intensity. A conventional LED may exhibit an FWHM beam angle of about 120 degrees, where the peak intensity of light distribution may exist at a zero-degree offset from the optical axis of the LED (e.g., centerbeam). Each lens of the lens array may, however, modify the intensity distribution, such that the FWHM beam angle may either be less than, or substantially the same as, the FWHM beam angle produced by a bare LED, but the intensity distribution may be modified by the lens such that the peak intensity may not exist at centerbeam, but rather may be offset from centerbeam.

In one example, the intensity distribution of a bare LED may exhibit a relatively wide FWHM beam angle (e.g., a 120-degree FWHM beam angle) having a peak intensity at centerbeam. A lens of the lens array may, for example, be used to substantially refract the FWHM beam angle of the bare LED between about 100 degrees and 140 degrees (e.g., between approximately 115 degrees and 128 degrees), but may alter the intensity distribution such that the peak intensity may not exist at centerbeam, but instead may exist at an offset between about 40 and 60 degrees (e.g., between approximately 50 and 55 degrees) half angle from centerbeam.

As per another example, a lens of the lens array may be used to substantially reduce the FWHM beam angle of the bare LED from about 120 degrees to between about 50 degrees and 90 degrees (e.g., between approximately 65 degrees and 75 degrees) and may further alter the intensity distribution such that the peak intensity may not exist at centerbeam, but instead may exist at an offset between about 15 and 35 degrees (e.g., between approximately 20 and 28 degrees) half angle from centerbeam.

Generally, each lens of the lens array may distribute light into a ray set that exhibits varying intensity depending upon the angle that each light ray of the projected ray set exhibits relative to a reference axis. For example, a reference axis of the LED may be defined as the axis that is orthogonal to the surface of the PCB to which the LED is mounted and each light ray emitted by the LED may be refracted by the lens to exhibit an intensity that is proportional to the angle that the refracted light ray forms with respect to the reference axis. In one embodiment, refracted light rays at lower angles relative to the reference axis may exhibit lower intensities while refracted light rays at higher angles relative to the reference axis may exhibit relatively larger intensities.

Refracted light rays incident upon a target surface may similarly be defined with respect to the reference axis. For example, light rays refracted by the lens that exhibit a zero-degree offset from the reference axis may be described as exhibiting a zero-degree incidence angle. Similarly, light rays refracted by the lens that exhibit non-zero-degree offsets from the reference axis may be described as exhibiting incidence angles greater than zero as measured relative to the reference axis.

A lens may be configured to refract light rays emitted by the LED to exhibit intensities that are proportional to their respective incidence angles. For example, refracted light rays with lower incidence angles may exhibit lower intensities as compared to refracted light rays with higher incidence angles. The lens may be further configured to substantially prohibit refraction of light rays exhibiting incidence angles greater than a reference angle.

The lens, therefore, may produce lower intensity light rays having lower incidence angles as compared to the intensity of light rays having relatively higher incidence angles. Such a lens may be particularly useful when the beam is to be projected onto a flat surface target with a substantially uniform illuminance across the entire illuminated surface regardless of the angle of incidence, or when the beam is to be projected onto a flat surface target with an increasing illuminance across the entire illuminated surface as the angle of incidence increases. Such a lens may be further useful when the beam is to be projected not only onto a flat surface below the light, but also onto objects that are adjacent to the flat surface at higher incidence angles with respect to the light.

Stated differently, since target illuminance is proportional to the intensity of the projected light ray and inversely proportional to the square of the distance between the target and the lens that is producing the projected light ray, a lens that produces light rays having intensities that are proportional to the angle of incidence up to a threshold angle may be used to produce substantially even or uniform illuminance on a flat plane across the full beam width. That is to say in other words, that as the angle of incidence of light rays projected by the lens increase, so does their intensity. Furthermore, by increasing the intensity of the light rays in proportion to the square of the distance between the lens and the target, a substantially even target illuminance may be projected across the entire illuminated flat surface regardless of the angle of incidence of light rays onto the target, or an illuminance may be projected onto a flat surface that increases with the angle of incidence. Adjacent targets may also be illuminated by light rays that do not illuminate the flat surface due to their higher angles of incidence, but due to the higher intensity of such light rays, may illuminate such adjacent targets with substantially equal illuminance, or with substantially increasing illuminance, as compared to those light rays that are incident on the flat surface.

It should be noted that the advantages obtained by using the horticultural lights in accordance with the present invention do not exist with conventional horticultural lights, which may include LED-based horticultural lights as well. For example, conventional horticultural lights typically use a very small, yet high power light source with a secondary reflector in order to obtain a particular distribution of light onto a typical grow bed. Such a light source, however, produces non-reflected light rays directly from the light source having increased intensity at centerbeam, which in turn requires increased vertical distance between the horticultural light and the canopy of plants below the horticultural light.

Alternately, smaller LED-based horticultural lights may be used, but are used in very large numbers so as to obtain a projection area substantially equal to that of the larger conventional horticultural lights. While reduced vertical distance between the smaller LED-based horticultural lights and the plant canopy may be achieved, cross-lighting becomes virtually non-existent and the amount of light projecting throughout the depth of the plant canopy is significantly reduced.

Accordingly, even when a particular coverage area is achieved, the illuminance projected onto the grow bed lacks uniformity and, therefore, includes "hot spots" and "dim spots" and generally provides uneven projected illuminance due to the inverse square law as discussed in more detail below. As discussed above, for example, conventional horticultural lights generally project maximum intensity at zero to low angles of incidence, which requires relatively large vertical distances to be established between the conventional horticultural light and the underlying plant. As a result, vertical distances between the conventional horticultural light and the corresponding plant must be maximized to, for example, prevent plant burn.

Horticultural lights in accordance with the present invention, on the other hand, utilize a dense array of lenses that optically vary the intensity of the light distributed by an associated array of LEDs to project a uniform illuminance across a large surface area of a flat plane, or to project an increasing illuminance as the angle of incidence increases from centerbeam, despite the effects of the inverse square law (e.g., regardless of the increased distances that the light travels to the target due to the increased angles of incidence). Accordingly, not only may the light projection area from each horticultural light fixture in accordance with the present invention be increased as compared to conventional horticultural lights, but the illuminance within the illuminated area may be made substantially uniform, or substantially increasing as incidence angles increase from centerbeam outward, as well. In addition, the illuminance projected onto secondary targets that are adjacent to the primary target may also be made to be substantially uniform, or substantially increasing as incidence angles increase from centerbeam outward, due to the increased intensity of light rays projected by the horticultural light fixture at angles that are incident upon the secondary targets.

In other embodiments, horticultural lights in accordance with the present invention may utilize other techniques, with or without optics, to vary light intensity. Variability of the light output (e.g., spectral variability) may be controlled, for example, using any number of wired protocols including 0-10V, I2C, digital multiplex (DMX), ethernet or digital addressable lighting interface (DALI) to name only a few. In addition, spectral variability may be achieved via wireless protocols, such as via ZigBee, Wi-Fi, Bluetooth or a thread-based mesh network, along with other wireless protocols. Furthermore, by combining broad-spectrum white LEDs with a combination of other LEDs may allow the horticultural light to produce photosynthetically active radiation (PAR).

For example, two or more sets of broad-spectrum LEDs may be utilized along with one or more sets of fixed-color LEDs (e.g., one set of blue LEDs and one set of red LEDs) in order to implement broad-spectrum illumination that may better simulate sun light. In addition, the two or more sets of broad-spectrum LEDs may exhibit different correlated color temperatures (CCT), such that once varying intensities of the light generated by both sets of broad-spectrum LEDs is mixed, a tunable CCT composite spectrum may result that may better simulate the various phases of the sun, may better simulate sunlight at the various latitudes that the sun may assume and may better simulate sun light across each of the four seasons.

In addition, the intensities of multiple horticultural lighting fixtures may be controlled within an indoor grow facility to better simulate the position of the sun throughout the daylight hours. For example, by increasing the intensity of easterly-positioned horticultural lighting fixtures in the morning hours may better simulate the rising sun, by increasing the intensity of centrally-positioned horticultural lighting fixtures during the mid-day hours may better simulate the mid-morning/mid-afternoon sun and by increasing the intensity of westerly-positioned horticultural lighting fixtures in the late afternoon/evening hours may better simulate the setting sun.

In one embodiment, each set of the multiple sets of LEDs may be arranged as independent channels of LEDs, where each channel of LEDs may be independently operated at a selected intensity based upon a magnitude of current that may be conducted by each channel of LEDs. The control circuitry that may be used to select the magnitude of current that may be conducted by each channel of LEDs may be integrated within the power supply that may also contain the bulk power conversion (e.g., alternating current (AC) to direct current (DC) and/or DC to DC power conversion electronics) and regulation (e.g., constant current regulation or constant voltage regulation) electronics.

Turning to FIG. 1, horticultural light 100 is exemplified, which may include one or more lens arrays (e.g., lens array 118 and 126). Each lens array may include one or more rows of lenses (e.g., four rows of lenses) and one or more columns of lenses (e.g., 12 columns of lenses). One or more LEDs (not shown) may be included behind each lens (e.g., lens 102) so that in one example, the number of LEDs included within horticultural light 100 may be equal to the number of lenses included in each lens array (e.g., 48 LEDs per lens array for a total of 96 LEDs per horticultural light 100). As per another example, multiple LEDs (e.g., one red, one green, one blue and one white LED from each RGBW channel of LEDs) may be included behind each lens and may further be rotated with respect to one another so as to smooth the light distribution projected by each multiple LED/single lens combination. In one embodiment, for example, each of 4 LEDs combined under a single lens may be attached to the underlying PCB at 0 degree, 45 degree, 90 degree and 135 degree offsets, respectively, whereby the magnitude of angle offset may be inversely proportional to the number of LEDs combined under a single lens (e.g., 180 degrees/4 equals a rotation offset of 45 degrees from one LED to the next).

Bezel 134 may, for example, provide a substantially constant pressure around a perimeter of horticultural light 100 to, for example, seal a substantially transparent media to horticultural light 100 thereby maintaining horticultural light 100 in a water proof/water resistant state. The transparent media may also press the lens array against the PCB behind the lens array, such that substantially 100% of the light generated by each LED may be directed through its respective lens and through the transparent media to prohibit virtually any of the light from being redirected back into horticultural light 100. While the dimensions (e.g., 4.5 inches wide×22 inches long) of horticultural light 100 may be significantly smaller than conventional LED horticultural lights (e.g., 4 feet wide×4 feet long), horticultural light 100 via its dense array of LEDs and associated lenses may nevertheless project a substantially equivalent amount of light onto a conventional grow bed, but may do so with substantially uniform illuminance, or substantially increasing illuminance from centerbeam outward, across the entire grow bed and adjacent grow beds unlike the substantially non-uniform illuminance, or substantially decreasing illuminance from centerbeam outward, as projected by conventional horticultural lights.

Horticultural light 100 may further include control circuitry (e.g., controllers 110, 112, 114 and 116) and associated circuitry (e.g., bias circuitry 124) such that any one or more LEDs (not shown) may be independently transitioned into conductive and non-conductive states on command. Alternately, LED control and bias circuitry (e.g., controllers 110, 112, 114, 116 and associated bias control circuitry 124) may not be co-located on the same PCB to which the associated LEDs are mounted, but may instead be located remotely to the PCB (e.g., on a modular control and bias circuit that may be interchangeably introduced into horticultural light 100 or into a bias and control bus that connects two or more horticultural lights 100 together).

In one embodiment, the conductive state of any multiple of LEDs (e.g., the LEDs, not shown, behind each row of lenses 126, 128, 130 and 132) may be independently controlled. In other embodiments, the conductive state of any multiple of LEDs (e.g., the LEDs, not shown, behind each column of each array of lenses 118 and 126) may be independently controlled. Once an LED (not shown) is transitioned to its conductive state, the associated lens (e.g., lens 102) may produce a light distribution that may exhibit a particular intensity profile, which may produce a substantially uniform target illuminance, or a substantially increasing target illuminance from centerbeam to the edge of the beam pattern, across a flat surface as discussed in more detail below.

Multiple horticultural lights 100 may be employed for use as horticultural lighting in a greenhouse, small indoor grow room, or in a commercial production facility as part of an integrated horticultural system. Horticultural light 100 may, for example, replicate natural light that may be absent in an indoor grow facility and may be controlled (e.g., via bias controller 124 and controllers 110, 112, 114 and 116) to deliver virtually any wavelength of light that may be produced by an LED, at virtually any intensity, at virtually any duty cycle that may be useful in a horticultural facility. Furthermore, virtually any mixture of LEDs may be utilized within horticultural light 100 to produce a wide range of color temperature, spectrum and color rendering index (CRI).

As an example, each channel of LEDs (e.g., rows of LEDs, not shown, behind rows of lenses 126, 128, 130 and 132, respectively) may each include a selection of LEDs that may produce a range of color temperature and CRI attributes. For example, the rows of LEDs (not shown) behind lens rows 126 and 128 may include LEDs exhibiting a color temperature of approximately 3000° K and a CRI greater than 90. As another example, the row of LEDs (not shown) behind lens row 130 may include LEDs exhibiting a color temperature of approximately between 5700° K and 6500° K and may exhibit a CRI less than 80. As per another example, the row of LEDs (not shown) behind lens row 132 may include LEDs exhibiting a narrow-bandwidth red color spectrum (e.g., at or below 1800° K or between 580 nm and 750 nm). It should be noted that virtually any combination of wavelength, color temperature, spectrum and CRI may be used to match the particular photosynthetic and photomorphogenic requirements of the crop of interest.

It should be further noted that the LEDs (not shown) may include a percentage (e.g., 75%) of phosphor converted white LEDs and a percentage (e.g., 25%) of narrow band red or blue spectrum LEDs, such as aluminum gallium indium phosphide (AlGaInP) LEDs. Alternately, for example, phosphor converted red LEDs may also be used, which may facilitate the use of indium gallium nitride (InGaN) LEDs exclusively, both for the phosphor converted white LEDs and the phosphor converted red LEDs. Such an arrangement of matched InGaN LEDs may, for example, provide a very broad spectrum white light with an emphasis on the blue and red spectra while also providing uniform thermal performance and degradation as well as the advantage of facilitating the implementation of strings of multiple LEDs (e.g., the string of LEDs, not shown, behind lens rows 126, 128, 130 and 132) that may be arranged serially with a substantially constant forward voltage.

As discussed in more detail below, bias controller 124 may include wired and/or wireless access control systems, such as Bluetooth, Wi-Fi, thread-based mesh, digital multiplex (DMX), I2C, ethernet or telecommunications-based control systems that may allow horticultural light 100 to be controlled remotely, either within the same facility, or via a regional or national control room. Accordingly, the lighting of one or more unmanned horticultural facilities may be centrally controlled by a single control station. Such a control station, for example, may also control other aspects of the horticultural facility. Air filtration and circulation systems, for example, may require remote access control for heat and exhaust mitigation. Various irrigation systems, such as drip irrigation, hydroponic flood benches and trough benches along with a nutrient management system may also be controlled by the control station. In general, the control station may not only control the one or more horticultural lights 100 of the horticultural facility, but also the nutrients, air circulation, irrigation, dehumidification, carbon dioxide ($CO_2$) injection and other facilities that may be required to maintain the exact environment needed by the various growing rooms, cloning rooms and flowering rooms of the horticultural facility.

Turning to FIGS. 2A and 2B, a front view and a rear view, respectively, of a lens array (e.g., lens array 118 of FIG. 1) are exemplified. Mechanical portions 202 and 204, for example, of the lens array may not include any optical attributes, but may instead provide a framework within which optical portions (e.g., lenses 206) may be configured into an array (e.g., multiple rows and columns of lenses 206). Mechanical portions 202 and 204 may, for example, include mounting features (e.g., apertures 208) that may facilitate the insertion of mounting hardware (e.g., screws) that may be used to mount the lens array to the underlying PCB and lighting fixture housing/heat sink (not shown). By utilizing such mounting hardware, mechanical portion 204 may be pressed against the underlying PCB and LEDs (not shown), which may in turn press the underlying PCB against the housing/heat sink (not shown) of the horticultural light (e.g., horticultural light 100) so as to promote effective conduction of heat away from the LEDs.

Mechanical portion 204 may further include raised portions 210 that may be used to create an optimal separation distance between the lens array and the underlying LED array (not shown). Indented portions 212 may, for example, accommodate the insertion of at least a portion of an LED package (e.g., the dome portion of an LED package). The height of raised portions 210 may be selected to create an optimal separation distance between the optical input portion of the lens (e.g., lens 206) and the associated LED (not shown) that is inserted into the corresponding indented portion 212 of lens 206 as discussed in more detail below. Raised portions 210 may exhibit a particular geometric shape (e.g., circular) so as to match a particular foot print of each LED (not shown) of the LED array. As such, raised portions 210 may impose a substantially uniform pressure surrounding, and in close proximity to, each associated LED (not shown) so as to create a uniform conduction path so that heat may be conducted away from the LED through the associated PCB and heat sink, thereby improving the performance of the LED.

In one embodiment, the array of lenses 206 may be arranged as an array of rows and columns of lenses, where each lens may exhibit a circular shape having a diameter (e.g., 13 mm diameter) and a separation distance from each neighboring lens (e.g., a separation distance of 16 mm center to center). The composition of the array of lenses 206 may be that of an optical grade polymer (e.g., acrylic) that may exhibit an index of refraction of between about 1.48 and 1.5 (e.g., approximately 1.491) or that of an optical grade polycarbonate that may exhibit an index of refraction of between about 1.5 and 1.7 (e.g., approximately 1.58).

Turning to FIG. 3, a cross-sectional view is exemplified in which LED package 306, having hemispherical dome portion 312, may protrude into indented portion 304 of lens 314. It should be noted that indented portion 304 may exemplify a cross-section of a lens array (e.g., a cross-section of indented portion 212 of the lens array of FIG. 2) where indented portion 304 may include optical input 308 to lens 314 that may accept the light distribution from LED package 306 into lens 314. Protrusion 302 may exemplify a cross-section of a lens array (e.g., a cross-section of mechanical portion 210 of the lens array of FIG. 2) where protrusion 302 includes surface area 316 that may be in communication with a PCB (not shown) to select an optimal separation distance (e.g., separation distance 318) between the LED deck (e.g., PCB 326 of LED package 306) and optical input 308 to lens 314. In one embodiment, separation distance 318 may be between about 0.3 mm and about 0.4 mm (e.g., approximately 0.35 mm).

Portion 310 may exemplify a cross-section of a lens array (e.g., a cross-section of lens 206 of FIG. 2) where portion 310 may be the optical output of lens 314 that produces the optically varied (e.g., refracted) light distribution. Light distribution from lens 314 may exhibit an optical axis (e.g., axis 320) that may be orthogonal to the mounting surface of the PCB (not shown) to which LED package 306 is mounted. In addition, the projected light distribution from lens 314 may be described in terms of the intensity of each ray and its geometric orientation with respect to axis 320 as well as the projected illuminance onto a flat plane and projected illuminance onto targets adjacent to the flat plane.

It should be noted that the lens array is configured such that a projected light distribution from an individual lens (e.g., lens 314) of the lens array may not be incident upon adjacent lenses (e.g., lenses 326 and 328) of the lens array. In one embodiment, for example, lens 314 may refract the light distribution of LED 306 into a half-beam angle between about 50 degrees and 90 degrees (e.g., between approximately 65 degrees and 75 degrees) having full-beam width 322 that is not incident on any adjacent lenses (e.g., lenses 326 and 328).

Turning to FIG. 4A, a light distribution is exemplified that may be produced by an LED/lens combination in accordance with one embodiment that may include an LED (e.g., LED package 306 of FIG. 3) and a lens (e.g., lens 314 of FIG. 3) to produce a light distribution as exemplified in FIG. 4A. As illustrated, for example, the light distribution from lens 314 may exhibit a center beam intensity (e.g., about 77 candela) at a zero-degree offset from the optical axis (e.g., axis 320 of FIG. 3). The light distribution from lens 314 may exhibit a peak intensity (e.g., 84 candela) offset from the center beam by an angle of about 22.5 degrees to about 27.5 degrees.

It can be seen, therefore, that if the light distribution of FIG. 4A is projected onto a target having a flat surface by a lens (e.g., lens 314 of FIG. 3), the distance between the lens and the target changes depending upon the angle of incidence of the light distribution onto the target. As an example, if the angle subtended by a light ray is offset from the optical axis (e.g., axis 320 of FIG. 3) by zero degrees, then the distance traveled by the light ray to the target is at its minimal value. As the angle subtended by a light ray referenced to the optical axis increases, so does the distance that the light ray must travel before being incident onto the target's surface.

According to the inverse square law, therefore, the target illuminance decreases in proportion to the inverse square of the distance between the lens and the target, thereby causing the target illuminance to decrease with increasing beam width. However, since the intensity of the light distribution of FIG. 4A increases with increasing beam angle up to a reference beam angle (e.g., between about 22.5 degrees to about 27.5 degrees), the target illuminance may nevertheless remain substantially uniform, or may substantially increase with increasing beam angle, despite the effects of the inverse square law as exemplified, for example, in the associated shaded illuminance plot of FIG. 4B. In addition, for example, since the intensity of light distribution is maximum at maximum beam angle, the effective distance of the illuminance onto targets adjacent to the main target may be extended, such as may be the case when projecting light through side portions of the canopies of adjacent plants.

Figure 5B:
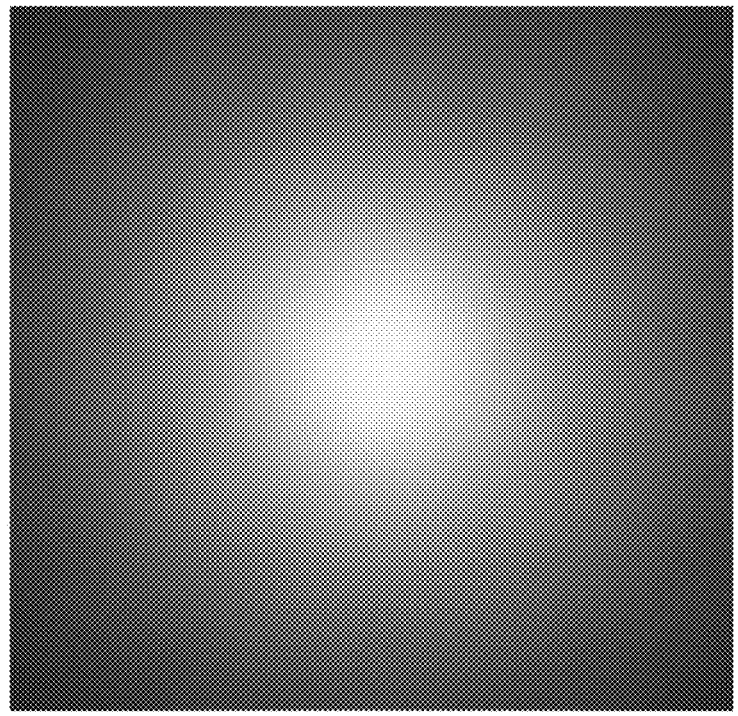
FIGS. 5A and 5B illustrate a conventional intensity distribution and shaded illuminance plot resulting from a bare LED without a lens or an LED with a standard Lambertian optic.
Figure 5A:
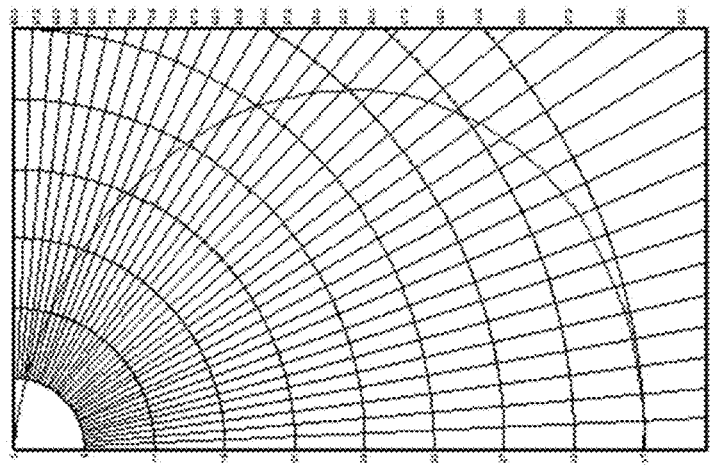

As a comparison, FIG. 5A exemplifies an intensity distribution from a bare LED (e.g., an LED without an optically varied distribution found on conventional horticultural lights) and FIG. 5B exemplifies the associated shaded illuminance plot. As can be seen from FIG. 5A, the intensity peaks at centerbeam (e.g., zero-degree offset from the LED's optical axis) and then decreases with increasing beam angle, which causes the illuminance, as exemplified by the shaded illuminance plot of FIG. 5B, to be non-uniform and decreasing in proportion to the inverse of the square of the increasing distance between the LED and its illumination target. It can be seen, therefore, that without the optical distribution of a lens in accordance with the various embodiments of the present invention, uniform illuminance onto a flat target is not possible. Rather, decreasing illuminance with increasing angles of incidence is produced.

Figure 6:
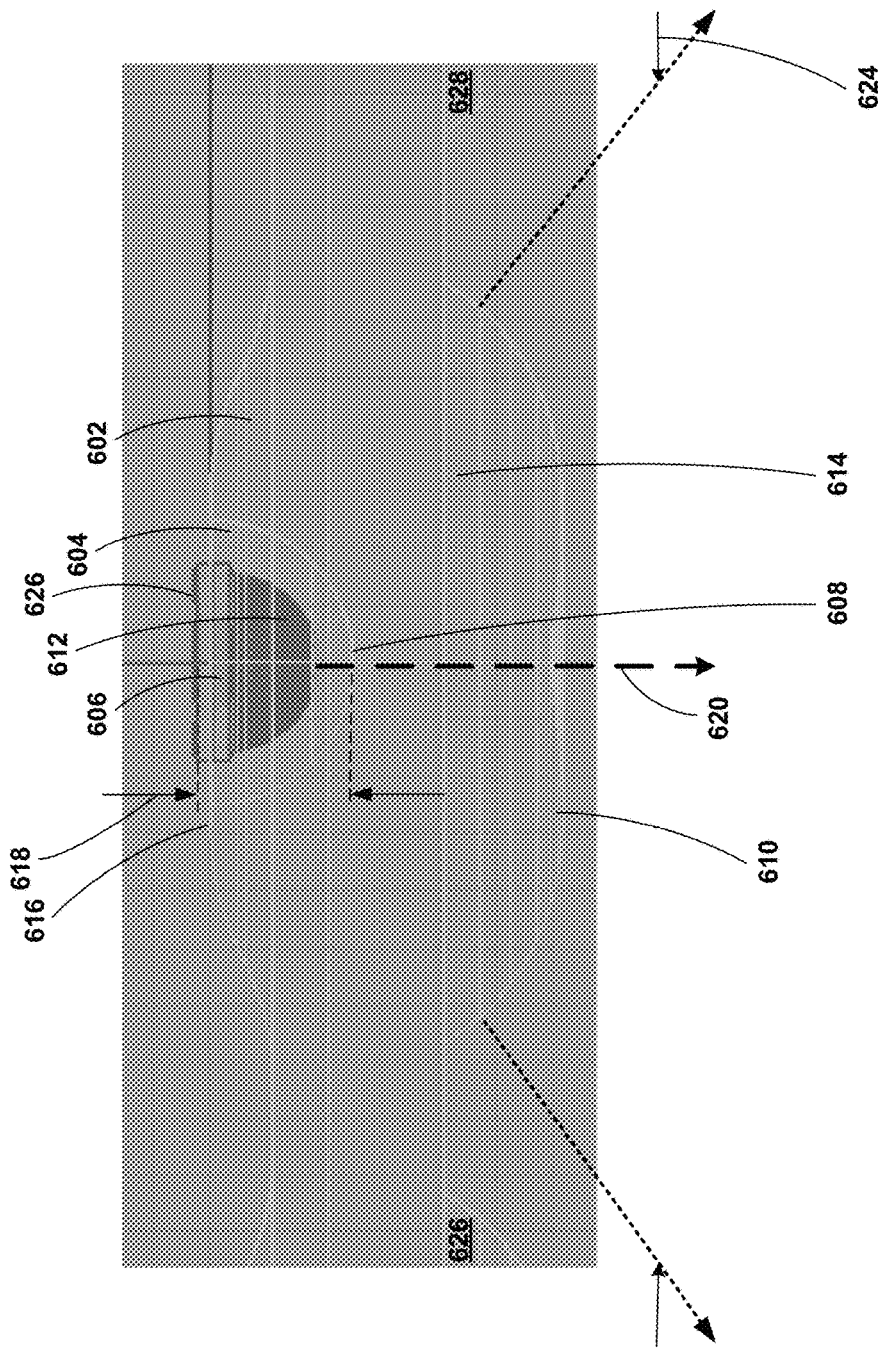
FIG. 6 illustrates a cross-section of an LED/lens pair in accordance with an alternate embodiment of the present invention.

Turning to FIG. 6, a cross-sectional view of an alternate LED/lens embodiment exhibiting a wider beam angle is exemplified in which LED package 606, having hemispherical dome portion 612, may protrude into indented portion 604 of lens 614. It should be noted that indented portion 604 may exemplify a cross-section of a lens array (e.g., a cross-section of indented portion 212 of the lens array of FIG. 2) where indented portion 604 includes optical input 608 to lens 614 that accepts the light distribution from LED 606 into lens 614. Protrusion 602 may exemplify a cross-section of a lens array (e.g., a cross-section of mechanical portion 210 of the lens array of FIG. 2) where protrusion 602 includes surface area 616 that may be in communication with a PCB (not shown) to select an optimal separation distance (e.g., separation distance 618) between the LED deck (e.g., PCB 626 of LED package 606) and optical input 608 to lens 614. In one embodiment, separation distance 618 may be between about 0.3 mm and about 0.4 mm (e.g., approximately 0.35 mm).

Portion 610 may exemplify a cross-section of a lens array (e.g., a cross-section of lens 206 of FIG. 2) where portion 610 may be the optical output of lens 614 that produces the optically varied (e.g., refracted) light distribution. Light distribution from lens 614 may exhibit an optical axis (e.g., axis 620) that may be orthogonal to the mounting surface of the PCB (not shown) to which LED package 606 is mounted. In addition, the projected light distribution from lens 614 may be described in terms of the intensity of each ray and its geometric orientation with respect to axis 620 as well as the projected illuminance onto a flat plane and the projected illuminance onto targets adjacent to the flat plane.

It should be noted that the lens array is configured such that a projected light distribution from an individual lens (e.g., lens 614) of the lens array may not be incident upon adjacent lenses (e.g., lenses 626 and 628) of the lens array. In one embodiment, for example, lens 614 may refract the light distribution of LED 606 into a beam angle between about 100 degrees and 140 degrees (e.g., between approximately 115 degrees and 128 degrees) having beam width 624 that is not incident on adjacent lenses 626 and 628.

Figure 7A:
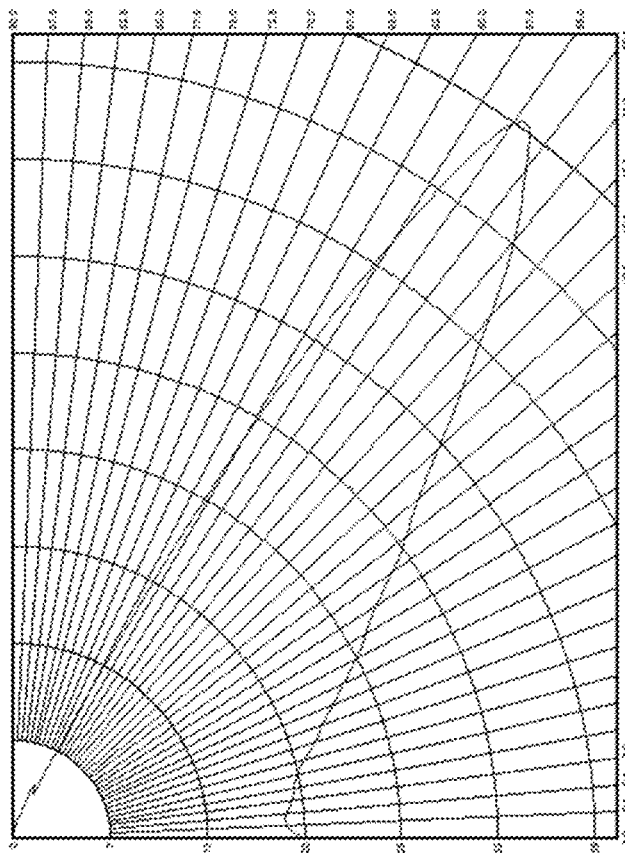
FIGS. 7A and 7B illustrate an intensity distribution and shaded illuminance plot in accordance with an alternate embodiment of the present invention.

Turning to FIG. 7A, a light distribution is exemplified that may be produced by an LED/lens combination in accordance with an alternate embodiment that may include an LED (e.g., LED package 606 of FIG. 6) and a lens (e.g., lens 614 of FIG. 6) to produce a light distribution as exemplified in FIG. 7A. As illustrated, for example, the light distribution from lens 614 may exhibit a center beam intensity (e.g., about 20 candela) at a zero-degree offset from the optical axis (e.g., axis 620 of FIG. 6). The light distribution from lens 614 may exhibit a peak intensity (e.g., 59 candela) offset from the center beam by an angle of about 50 degrees to about 55 degrees (e.g., approximately 54 degrees).

It can be seen, therefore, that if the light distribution of FIG. 7A is projected onto a target having a flat surface by a lens (e.g., lens 614 of FIG. 6), the distance between the lens and the target changes depending upon the angle of incidence of the light distribution onto the target. As an example, if the angle subtended by a light ray is offset from the optical axis (e.g., axis 620 of FIG. 6) by zero degrees, then the distance traveled by the light ray to the target is at its minimal value. As the angle subtended by a light ray referenced to the optical axis increases, so does the distance that the light ray must travel before being incident onto the target's surface.

Figure 7B:
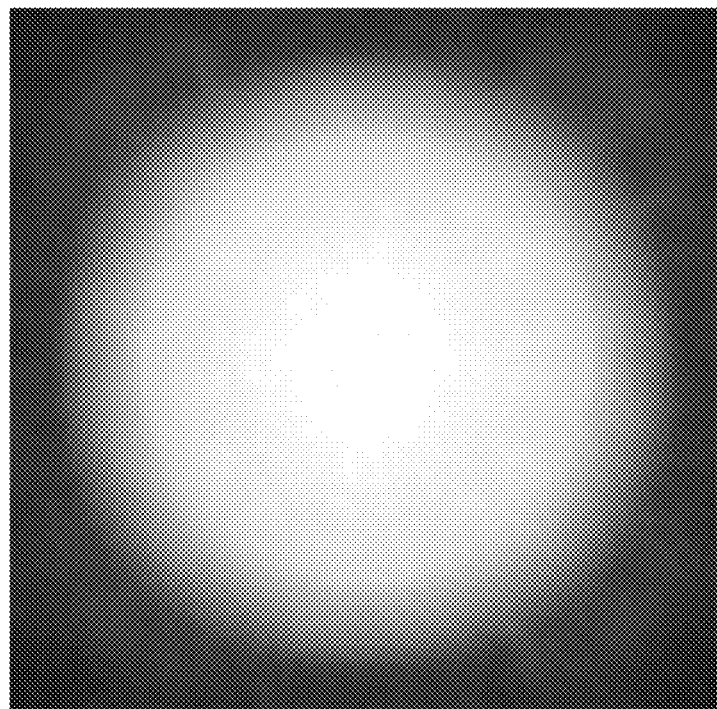

According to the inverse square law, therefore, the target illuminance decreases in proportion to the inverse square of the distance between the lens and the target, thereby causing the target illuminance to decrease with increasing beam width. However, since the intensity of the light distribution of FIG. 7A increases with increasing beam angle up to a reference beam angle (e.g., about 54 degrees), the target illuminance may nevertheless remain substantially uniform, or may substantially increase with increasing beam angle, despite the effects of the inverse square law as exemplified, for example, in the associated shaded illuminance plot of FIG. 7B. In addition, for example, since the intensity of light distribution is maximum at maximum beam angle, the effective distance of the illuminance onto targets adjacent to the main target may be extended, such as may be the case when projecting light through side portions of the canopies of adjacent plants.

In comparing the intensity distribution plots of FIGS. 4A and 7A, it can be seen that lens 314 of FIG. 3 produces a greater peak intensity than the peak intensity produced by lens 614 of FIG. 6. Furthermore, since the beam angle produced by lens 614 of FIG. 6 is wider than that produced by lens 314 of FIG. 3, the area illuminated by lens 614 may be greater than the area illuminated by lens 314, but the illuminance produced by lens 614 may be less than that produced by lens 314 given the same distance to target. Accordingly, while the number of horticultural lights (e.g., horticultural lights 100 of FIG. 1) utilizing lens 614 needed to illuminate a given target area may be less than the number of horticultural lights utilizing lens 314 needed to illuminate the same target area, horticultural lights utilizing lens 614 may be mounted closer to the target area to achieve the same illuminance generated by horticultural lights utilizing lens 314 that are mounted further away from the target area. Accordingly, less vertical distance between the horticultural light and the associated grow bed may be needed when utilizing lens 614, thereby allowing multiple levels of grow beds to be established floor to ceiling within the indoor horticultural facility.

Figure 8:
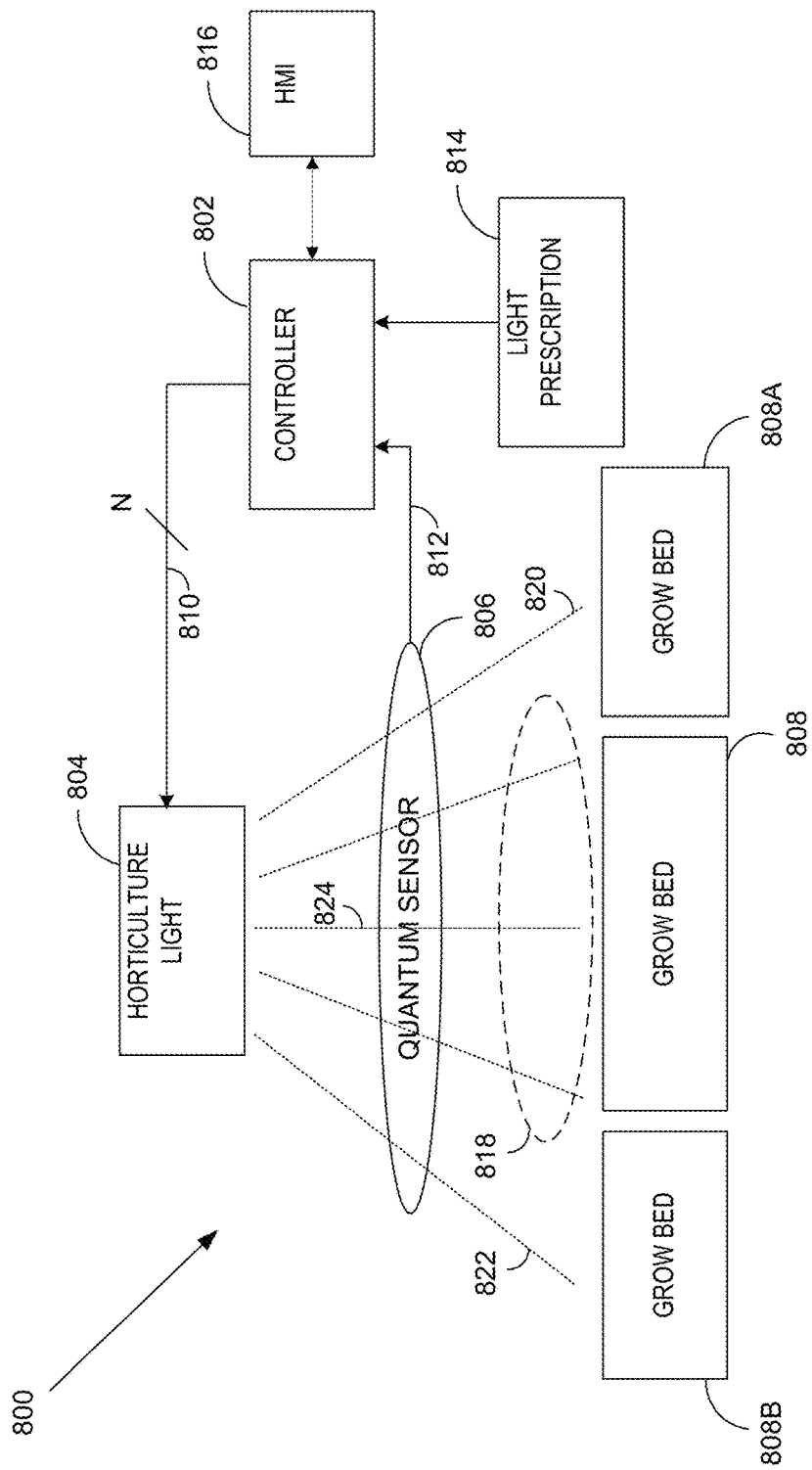
FIG. 8 illustrates a horticulture system in accordance with one embodiment of the present invention.

Turning to FIG. 8, horticultural system 800 is exemplified including horticulture light 804, which may include a lens array (e.g., lens array 118 and 126 as exemplified by horticulture light 100 of FIG. 1). In alternate embodiments, horticulture light 804 may not include a lens array, or may use a different lens array layout. In addition, horticultural system 800 may include grow beds 808, 808A and 808B that may be used to cultivate virtually any crop that may be grown within a horticulture facility. Horticultural lighting system 800 may further include, for example, quantum sensor 806, which may include a photosynthetically active radiation (PAR) sensor having a uniform sensitivity to PAR light, a light meter to measure instantaneous light intensity and/or a data logger to measure cumulative light intensity. Quantum sensor 806 may, for example, provide spectrographic data, which may include correlated color temperature (CCT), CRI, chromaticity and photosynthetic photon flux (PPF) associated with horticulture light 804, among other spectrographic data.

In one embodiment, controller 802 may access a database (e.g., light prescription database 814), which may include predetermined light prescriptions for controlling the light output from horticulture light 804 and may then utilize interface 810 to tune horticulture light 804 in accordance with the predetermined light prescriptions (e.g., prescribed light intensity, CCT and color spectrum). Controller 802 and interface 810 may, for example, be used by an operator to either manually tune horticulture light 804 to manual settings or tune horticulture light 804 to predetermined light prescriptions 814. Alternately, controller 802 may automatically update horticulture light 804 based upon comparisons between quantum sensor measurements 812 and light prescriptions 814 using closed-loop feedback control so as to maintain horticulture light 804 within operational constraints as defined by light prescriptions 814. For example, the temperature of horticulture light 804 may increase, thereby increasing the temperature of the LEDs contained within horticulture light 804, which may in turn decrease an intensity of light generated by horticulture light 804. As a result of closed-loop feedback, the decreased intensity due to increased temperature may be detected by quantum sensor 806 and reported to controller 802, whereby controller 802 may responsively increase the intensity of the light distributed by horticulture light 804. Conversely, as discussed in more detail below, controller 802 may instead invoke other measures (e.g., increased air flow), which may then lower the temperature of horticulture light 804, thereby resulting in an increased intensity light distribution.

Controller 802 may provide command and control signals to horticulture light 804 via interface 810 (e.g., via a wired protocol such as 0-10V, I2C, DALI or DMX, or via a wireless protocol, such as ZigBee, Wi-Fi, thread-based mesh network or Bluetooth). Controller 802 may receive all measurement data from quantum sensor 806 and may provide such results via human-machine interface (HMI) 816 to an operator of horticultural system 800 so that the operator may ascertain the performance characteristics of horticulture light 804. It should be noted that HMI 816 may either be located within the same facility as controller 802, or may be located remotely within a regional or national control room, so that multiple controllers 802 in multiple grow facilities may be centrally managed remotely.

As discussed above in relation to FIG. 1, horticulture light 804 may implement multiple arrays of LEDs, whereby each LED array may be arranged into channels (e.g., along rows and/or columns) and each channel of LEDs may be controlled separately and independently. In one embodiment, horticulture light 804 (e.g., as discussed above in relation to horticulture light 100 of FIG. 1) may implement multiple channels (e.g., 4 channels) whereby each row of LEDs (e.g., rows 126, 128, 130 and 132 of FIG. 1) may represent a separately and independently controllable LED channel.

Horticulture light 804 may be utilized to produce broad-spectrum white light (e.g., between about 420 nm and about 750 nm) with variable CCT so that the light spectrum may be tuned to better simulate various aspects of sun light. For example, multiple phases of the sun, simulation of sun light in all four seasons (e.g., fall, winter, spring, summer) and latitude of the sun may be better simulated using CCT control. Furthermore, no matter what CCT value may be selected, the intensity of light produced may be selectable as well, such that in one example, multiple CCT values may be obtained while maintaining a constant intensity.

As discussed above, horticultural light 804 may include appropriate lens/LED combinations to provide illuminance 818, where illuminance 818 may be substantially uniform or may substantially increase as the angle of incidence increases with respect to optical axis 824. In addition, through increased intensity at increased beam angles as compared to optical axis 824, light rays 820 and 822 may illuminate adjacent grow beds 808A and 808B, respectively, with increased illuminance from the sides of the respective grow beds to better simulate light received from the sun. Stated differently, by increasing the intensity at increasing angles of incidence as compared to optical axis 824, light generated by horticulture light 804 may not only be effective as to grow bed 808, but also to grow beds 808A and 808B even though grow beds 808A and 808B are further away from horticulture light 804 as compared to grow bed 808.

In one embodiment, horticulture light 804 may include multiple channels (e.g., two rows) of broad-spectrum white LEDs, whereby the intensity of each row of LEDs may be controlled by a separate channel (e.g., 1 of N channels 810) of controller 802. The first set of broad-spectrum white LEDs may, for example, exhibit a first CCT (e.g., a CCT equal to about 2700K) and the second set of broad-spectrum white LEDs may exhibit a second CCT (e.g., a CCT equal to about 5700K). Through operation of controller 802, the intensity of each set of broad-spectrum white LEDs may be controlled to create an averaged mix of light exhibiting a CCT between about 2700K and 5700K as may be required (e.g., as required by light prescription 814). Alternately, each channel of broad-spectrum white LEDs may include mixed CCT values (e.g., both 2700K and 5700K).

In alternate embodiments, the number of channels of broad-spectrum white LEDs may, for example, be increased (e.g., increased to 3 channels) each channel exhibiting a different CCT value (e.g., 2700K, 4000K and 6000K). In such an instance, the averaged CCT value of the 3-channel combination may be variable between about 2700K and 6000K, but with an emphasis of mid-range energy due to the addition of the 3rd channel (e.g., the 4000K channel) of broad-spectrum white LEDs. Alternately, each channel of broad-spectrum white LEDs may include mixed CCT values (e.g., all three of 2700K, 4000K and 5700K).

In yet other embodiments, horticulture light 804 may include one or more channels of fixed color LEDs (e.g., one channel of red LEDs and/or one channel of blue LEDs) in addition to one or more channels of broad-spectrum white LEDs. In such an instance, even wider ranging mixed CCT values may be obtained, since the averaged CCT values produced by the broad-spectrum white LEDs may be pushed to lower values (e.g., through the use of the variable intensity red channel) and/or pushed to higher values (e.g., through the use of the variable intensity blue channel).

Even broader spectrums may be achieved, for example, when the one or more channels of fixed color LEDs may themselves be implemented using multiple wavelengths. For example, a channel of red LEDs may be implemented through use of a first proportion of red LEDs (e.g., 50% of the red LEDs producing light with a 660 nm wavelength) and a second proportion of red LEDs (e.g., 50% of the red LEDs producing light with a 625 nm wavelength). Additionally, a channel of blue LEDs may be implemented through use of a first proportion of blue LEDs (e.g., 50% of the blue LEDs producing light with a 440 nm wavelength) and a second proportion of blue LEDs (e.g., 50% of the blue LEDs producing light with a 460 nm wavelength). Accordingly, even broader spectrum red and blue channels may be combined with broad-spectrum white channels to create the broadest spectrum light possible all while also providing variable CCT.

Figure 9:
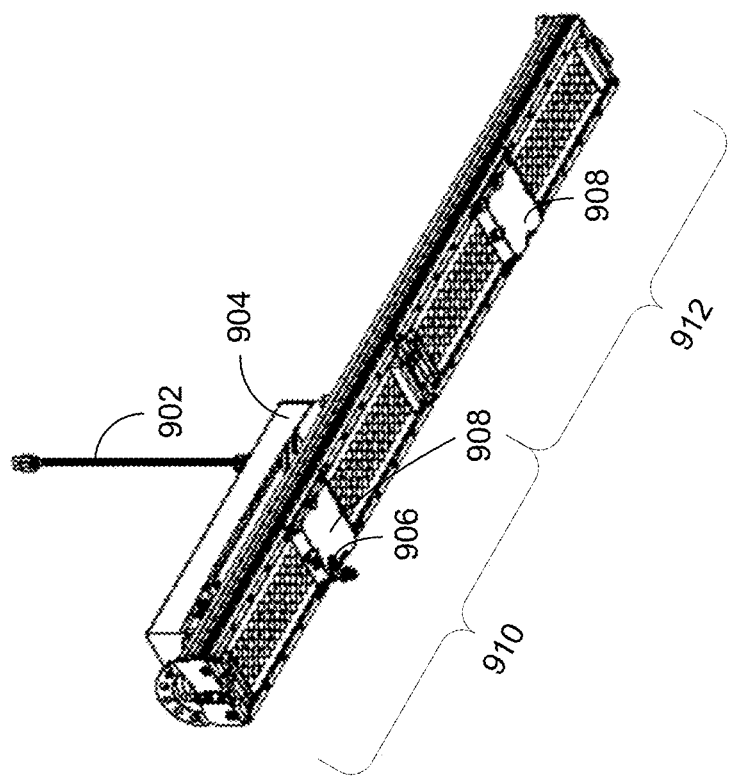
FIG. 9 illustrates an LED-based horticultural light in accordance with an alternate embodiment of the present invention.

Turning to FIG. 9, an alternate embodiment of horticulture light 900 is exemplified, in which substantially none of the bias and control circuitry that may be associated with each channel of LEDs is co-located on the same PCB as each LED. Instead, the bias and control circuitry for each channel of LEDs (e.g., 4 channels 810 of FIG. 8) may be integrated within the bulk power conversion (e.g., power supply 904) that may be mounted to horticulture light 900. In addition, power supply 904 may convert the AC voltage (e.g., 110 VAC at 60 Hz applied via power cord 902) to a wide ranging DC potential between approximately 10 VDC and 300 VDC (e.g., approximately between about 12 VDC and 48 VDC). Buck, boost and/or buck/boost converters (not shown) also contained within power supply 904 may form at least a portion of the bias and control circuitry that may be required to illuminate each channel of LEDs contained within horticulture light 900 at specified intensities as may be selected via a wired or wireless control interface (e.g., a wired DMX interface).

Horticulture light 900 may exhibit a longer length profile as compared, for example, to horticulture light 100 of FIG. 1. For example, a longer profile may be obtained by concatenating two horticulture lights 910 and 912 (e.g., two horticulture lights 100 of FIG. 1 end to end for twice the length). It should be noted that the circuitry of controller areas (e.g., areas 908) that may otherwise exist within other horticulture lights (e.g., horticulture light 100 of FIG. 1) may instead be contained within power supply 904.

Figure 10:
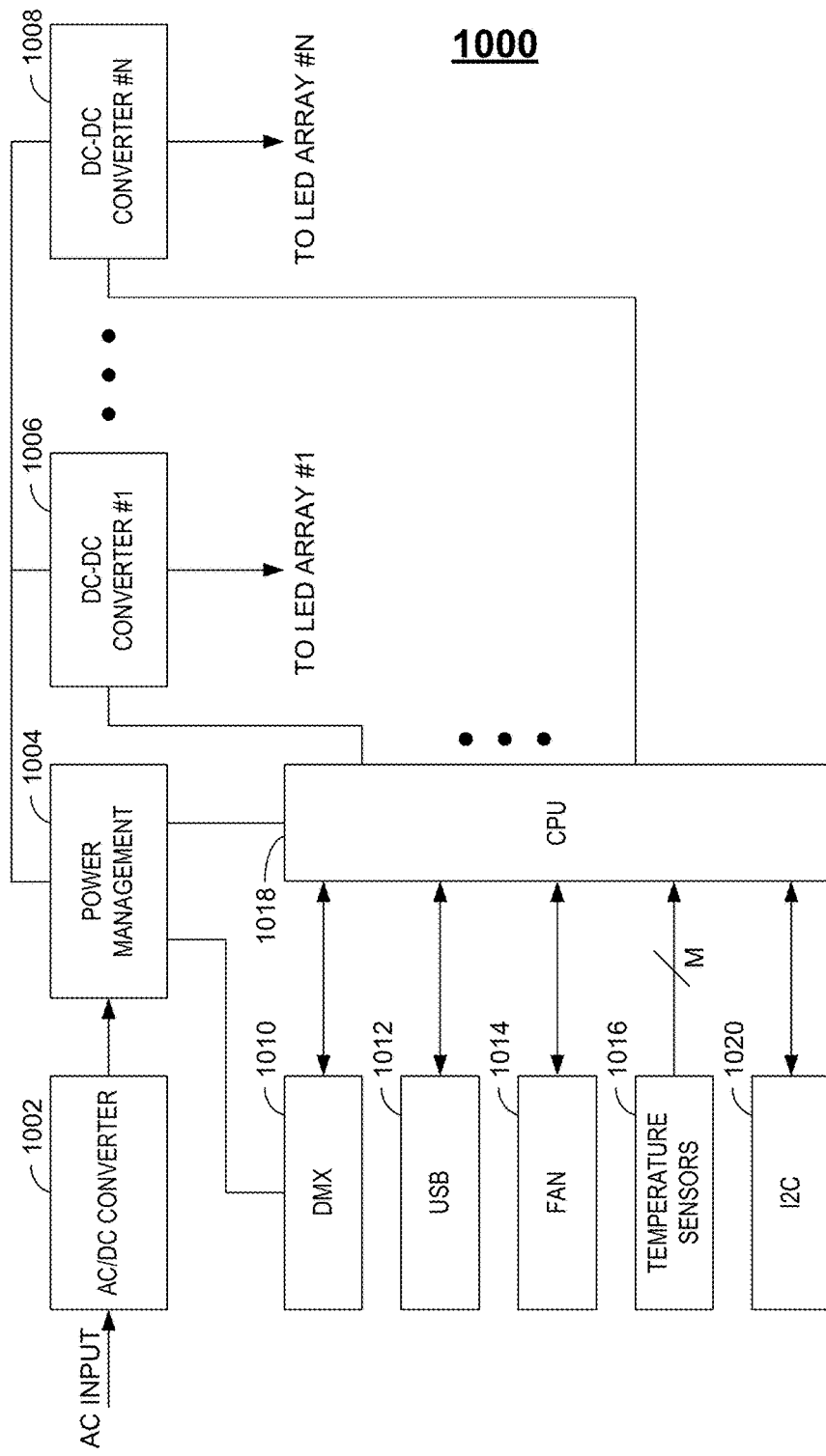
FIG. 10 illustrates a block diagram of a power supply that may be used with the LED-based horticultural light of FIG. 9.

Turning to FIG. 10, a block diagram of power supply 904 of FIG. 9 is illustrated, which may include AC/DC bulk conversion block 1002, power management block 1004 and one or more DC-DC converters (e.g., buck, boost and/or buck/boost converters 1006-1008) to, for example, provide sufficient power to vary the intensity of the one or more arrays of LEDs contained within the horticulture light (e.g., horticulture light 900 of FIG. 9).

In one embodiment, for example, converters 1006-1008 may generate a voltage substantially equal to the forward voltage of their respective LED arrays and may vary the drive current according to a constant current topology to achieve a desired intensity of each LED array (e.g., as may be determined by light prescription 814 or HMI 816 of FIG. 8). The desired intensity of each LED array may, for example, be controlled via DMX 1010 and/or I2C 1020, where each LED array may exist within the same DMX universe and may be responsive to an 8-bit intensity control word received within its designated DMX slot. DMX 1010 may facilitate remote device management (RDM) data handling, whereby full duplex communications may be accommodated to, for example, define DMX slot numbers and to correlate those DMX slot numbers to each of the respective LED arrays.

Firmware executed by CPU 1018 may reside, for example, within memory (e.g., flash memory), which may be local to CPU 1018 or remotely located with respect to CPU 1018. Firmware may, for example, be changed or updated (e.g., boot loaded) via universal serial bus (USB) 1012 (e.g., USB port 906 of FIG. 9). Such firmware may control, for example, power management to the LED arrays as provided by converters 1006-1008. In one embodiment, for example, firmware executed by CPU 1018 may operate DC-DC converters 1006-1008 according to a fixed-frequency, constant current topology that may select a minimum and a maximum current to be conducted by each LED array through analog control. Furthermore, firmware executed by CPU 1018 may operate DC-DC converters 1006-1008 (e.g., via pulse width modulated (PWM) control signals) to select any number (e.g., 255) of intensity levels that may be generated by each LED array at any current setting. In one example, current magnitudes between 1% and 25% of the maximum current magnitude may be PWM modulated so as to provide precision dimming at the lowest levels of dimming (e.g., 255 levels of dimming may be implemented via PWM modulation to achieve approximately 0.1% dimming granularity between 1% and 25% of maximum current).

Firmware executed by CPU 1018 may, for example, receive telemetry data (e.g., thermal data via temperature sensors 1016) relative to, for example, the operating temperature of the horticulture light (e.g., horticulture light 900 of FIG. 9). In response, CPU 1018 may issue fan control signals (e.g., fan RPM control signals) to fan 1014 so as to maintain horticulture light 900 within a specified temperature range. In addition, CPU 1018 may limit the maximum current conducted by each LED array as discussed above to maintain the operating temperature of horticulture light 900 below a maximum temperature range. For example, if the maximum temperature range is exceeded by horticulture light 900, CPU 1018 may first increase the speed at which one or more fans 1014 may be operating, thereby providing increased air flow to horticulture light 900 in an effort to lower the operating temperature of horticulture light 900 below its maximum operating temperature. If the operating temperature is not reduced below the maximum temperature range, then CPU 1018 may decrease the magnitude of current conducted by each LED array in a linear rollback fashion until the operating temperature is reduced below the maximum temperature range. As discussed above in relation to FIG. 8, for example, CPU 1018 may be operating in response to quantum sensor input data (e.g., quantum sensor input data that may be received via I2C interface 1020), whereby intensity variations of light measured by the quantum sensor may be compared to light prescriptions contained within a database and through closed-loop feedback, CPU 1018 may counteract such intensity variations any number of ways. For example, an amount of current generated by DC-DC converters 1006-1008 may be changed to effect an intensity variation in the LED arrays. Alternately, for example, adjusting the speed by which fan 1014 is spinning may control the temperature of the one or more LED arrays, which may then effectuate a change in intensity of light generated by the LED arrays, since light intensity generated by the LED arrays may be inversely proportional to the temperature of the LED arrays.

As discussed above, firmware received via USB 1012 may be used to control certain parameters of operation of horticulture light 900 via a computer (not shown) that may be communicating with USB 1012. For example, any number of DC-DC converters 1006-1008 may be activated depending upon the number of LED arrays or channels that may exist within horticulture light 900. For example, if eight DC-DC converters exist within power supply 904, but only four LED arrays or channels exist within a particular horticulture light, then half of the DC-DC converters may be activated for operation via firmware loaded via USB 1012 while the other half remain in a deactivated state. In operation, each activated DC-DC converter may receive a unique DMX address, such that DMX control words may be correctly addressed to the corresponding DC-DC converter to correctly control the intensity of the associated LED array.

In addition, firmware loaded via USB 1012 may be used to select the temperature trigger value, such that either fan RPM may be increased or LED array current drive may be decreased (as discussed above) once the temperature trigger value (e.g., as detected by temperature sensors 1016) is exceeded. Dim control may also be selected via firmware loaded via USB 1012 to, for example, select the rate at which the LED array(s) may be dimmed. For example, each DMX control word (e.g., 256 control words per DMX slot total) may correspond to a particular LED array intensity as may be controlled by a corresponding PWM signal as generated by CPU 1018. User controllable dimming as defined by firmware loaded via USB 1012 may, for example, be used to select the rate at which such intensity variation occurs.

Figure 11:
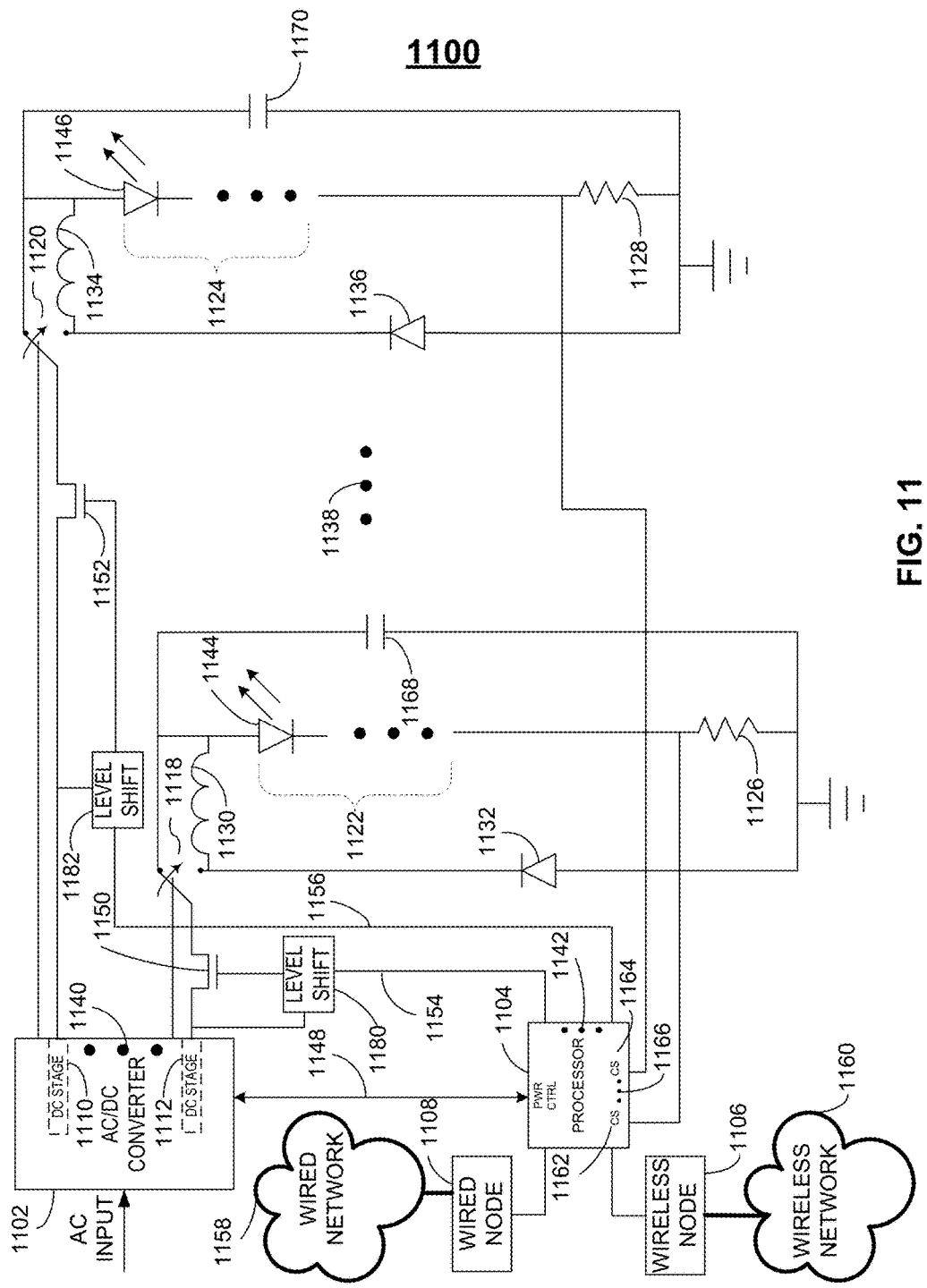
FIG. 11 illustrates a lighting system in accordance with one embodiment of the present invention.

Turning to FIG. 11, a schematic diagram of lighting system 1100 is illustrated, which may include AC/DC converter 1102 (e.g., power supply 904 of FIG. 9), which may include one or more constant current and/or constant voltage DC output stages (e.g., DC stages 1110, 1112 and/or 1140) and an auxiliary low voltage output (e.g., 5 VDC not shown) with which components (e.g., processor 1104, wireless node 1106 and wired node 1108 of lighting system 1100) may derive their operational power. Any one or more of DC output stages 1110, 1112 and 1140 may provide power via any one or more switched-mode conversion techniques (e.g., buck, boost, buck/boost or flyback).

AC/DC converter 1102 may be configured to provide sufficient power to, for example, vary the intensity of the one or more arrays of LEDs contained within one or more horticulture lights (e.g., one or more horticulture lights as exemplified in FIG. 9). It should be noted that while only two LED arrays 1122 and 1124 are exemplified, any number of LED arrays 1138 and associated bias control circuitry may be accommodated by any number of DC stages within AC/DC converter 1102. Furthermore, each LED array 1122 and 1124 may include virtually any number (e.g., one or more) of LEDs 1144 and 1146, respectively.

As discussed in more detail below, the magnitude of DC voltage available from any one DC stage 1110, 1112 or 1140 may be adjusted as needed (e.g., via control 1148 from processor 1104) to be substantially equal to the combined forward voltage of any one associated LED string 1122, 1124 or 1138. In one embodiment, for example, processor 1104 may empirically deduce the magnitude of forward voltage required to forward bias each LED in each string LED string 1122, 1124 and/or 1138. Once the magnitude of forward voltage needed to forward bias each LED in each LED string 1122, 1124 and/or 1138 is known, processor 1104 may then command one or more associated DC stages 1110, 1112 and/or 1140 (e.g., via control 1148) to the determined magnitude of forward voltage so that each LED string may be operated as efficiently as possible. In alternate embodiments, DC stages 1110, 1112 and/or 1140 may automatically determine the magnitude of forward voltage needed to forward bias each LED in each LED string 1122, 1124 and/or 1138 and may communicate that voltage to processor 1104 (e.g., via control 1148).

In one embodiment, each LED array may be configured to operate in accordance with one or more bias topologies. As per one example, LED array 1122 and 1124 may be configured in parallel to operate using a single voltage rail (e.g., a single voltage rail generated by one of DC stages 1110, 1112 or 1140) such that switches 1118 and/or 1120 may be configured as shown (e.g., via control 1148 from processor 1104) to produce a forward voltage across each LED array and a forward current through each LED array as may be modulated by a power switch (e.g., field effect transistors (FETs) 1150 and/or 1152) via control signals 1154 and/or 1156, respectively, as may be appropriately level shifted by level shifters 1180 and 1182, respectively, whereby the current conducted by each LED array may be stabilized via ballast elements (e.g., resistors 1126 and 1128). Other power switching elements, such as insulated gate bipolar transistors (IGBTs) or vertical MOSFETs, may be used instead of FETs 1150 and 1152 as well.

As per another example, each LED array may be configured in parallel to operate using a single voltage rail (e.g., a single voltage rail generated by DC stage 1110 or DC stage 1112) whereby switches 1118 and 1120 may be configured in the opposite configuration as shown to produce a forward voltage across each LED array and a forward current through each LED array as may be modulated by a power switch (e.g., FETs 1150 and 1152) via control signals 1154 and/or 1156, respectively, as may be appropriately level shifted by level shifters 1180 and 1182, respectively, whereby the average current conducted by each LED array may be stabilized via a current stabilization network (e.g., inductor 1130/diode 1132 and inductor 1134/diode 1136, respectively).

Still other examples include configurations whereby each LED array (e.g., LED array 1122 and 1124) may be operated independently using a dedicated DC stage (e.g., DC stage 1112 and DC stage 1110, respectively) in either of a constant voltage or constant current configuration using either ballast or inductor-based current stabilization techniques as may be selected by switches 1118 and 1120.

As discussed in more detail below, wired node 1108 may include any wired interface (e.g., DMX, I2C, Ethernet, USB, DALI, etc.) that may be used to configure lighting system 1100 (e.g., via processor 1104) for operation and/or allow processor 1104 to communicate the status and operational capability of lighting system 1100 to wired network 1158 (e.g., BACnet-enabled wired network 1158). Similarly, wireless node 1106 may include any wireless interface (e.g., Wi-Fi, thread-based mesh, Bluetooth, ZigBee, etc.) that may similarly be used to configure lighting system 1100 (e.g., via processor 1104) for operation and/or allow processor 1104 to communicate the status and operational capability of lighting system 1100 to wireless network 1160 (e.g., BACnet-enabled wireless network 1160).

As discussed above, processor 1104 may be configured to deduce the number of LED strings that may be under its control as well as the number of LEDs in each LED string. Such deduction, for example, may occur each time lighting system 1100 is provisioned with LEDs, either at initial deployment or after reconfiguration. Processor 1104 may then configure the operation of AC/DC converter 1102 for optimal performance in response to the number of LED strings found and/or the number of LEDs in each LED string subsequent to such deduction. Accordingly, the number of LED strings and the number of LEDs in each LED string contained within lighting system 1100 may not necessarily be fixed at initial deployment or after each reconfiguration, but rather may be dynamic such that processor 1104 may intelligently determine the lighting capability of lighting system 1100 (e.g., the number of LED strings and the number of LEDs in each LED string after initial deployment and/or after each reconfiguration) and may, therefore, intelligently select the most efficient mode of operation of each DC stage (e.g., constant current, constant voltage or a mixture of both), the most efficient magnitude of voltage and/or current to be generated by each DC stage and may also intelligently select the most efficient current stabilization mode for each LED string (e.g., ballast or inductor-based current stabilization).

It should be noted that the mode of operation of DC stages 1110, 1112 and 1140 may be programmable (e.g., via control 1148 of processor 1104) to either a constant-voltage or a constant-current mode of operation. Conversely, the mode of operation of DC stages 1110, 1112 and 1140 may be fixed such that a mixture of both constant-voltage and constant-current DC stages may exist within AC/DC converter 1102 and may be individually selected for operation (e.g., via control 1148 of processor 1104) and individually connected to respective LED strings 1122, 1124 and/or 1138 via a multiplexer (not shown) within AC/DC converter 1102.

In alternate embodiments, each DC stage of AC/DC converter 1102 may be paired with either a ballast-based current stabilization network or an inductor-based current stabilization network, such that switches 1118 and 1120 may no longer be necessary. In addition, the operational mode of each DC stage (e.g., constant-current or constant-voltage) may be predetermined, such that upon configuration of lighting system 1100, LED strings 1122, 1124 and/or 1138 may be statically paired with a ballast-based current stabilization network, an inductor-based current stabilization network, or both, and each pairing may include constant-voltage and/or constant-current topologies.

Figure 12:
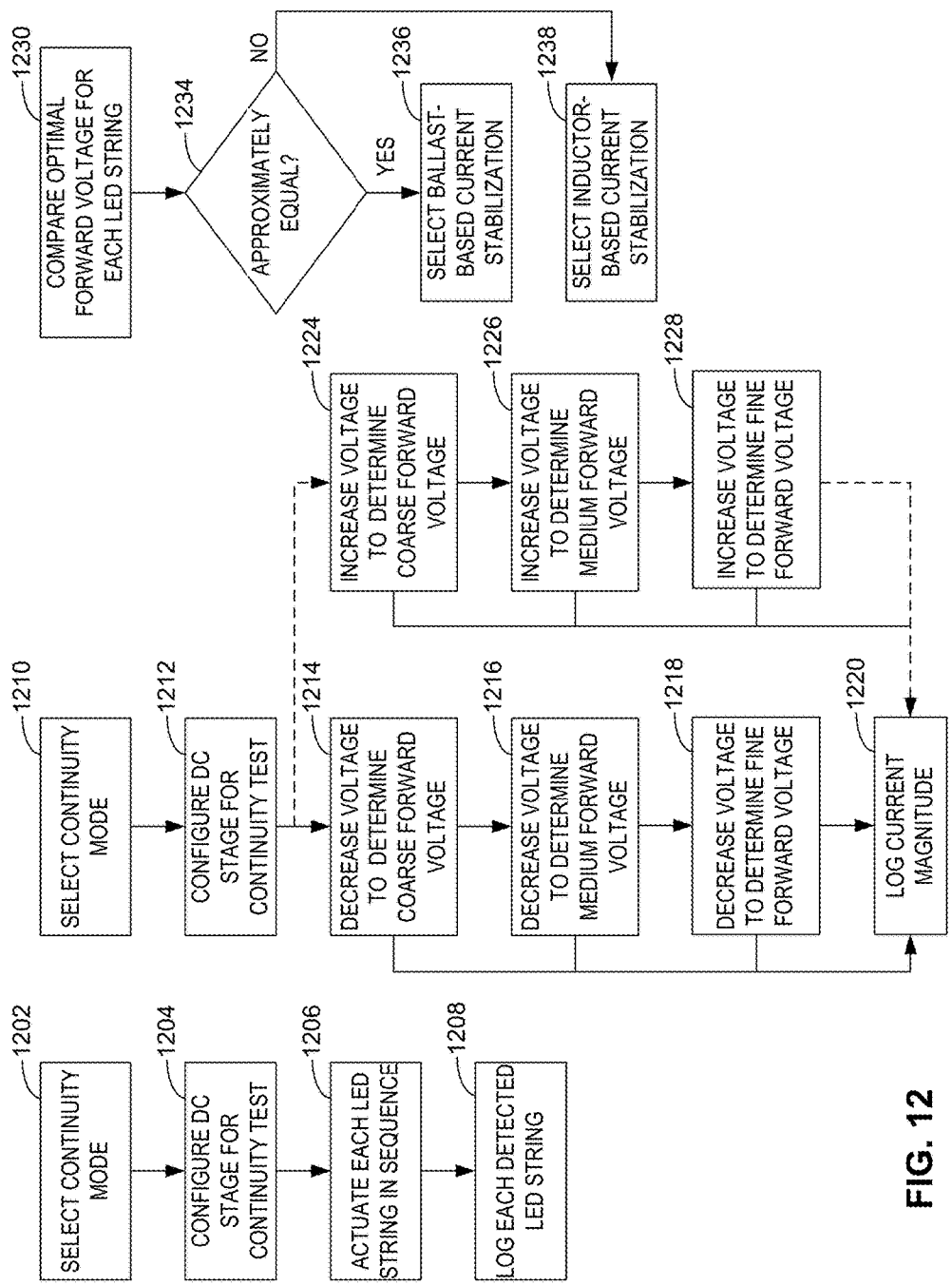
FIG. 12 illustrates flow diagrams in accordance with several embodiments of the present invention.

Turning to FIG. 12, flow diagrams are exemplified whereby processor 1104 may first discover the number of LED strings initially provisioned and/or reconfigured within lighting system 1100. Next, processor 1104 may then configure the bias and stabilization networks of lighting system 1100 that may be necessary for the most efficient mode of operation of each detected LED string.

In step 1202, for example, processor 1104 may first select a continuity mode, whereby AC/DC converter 1102 may be selected to perform a continuity test to determine the number of LED strings that may exist within lighting system 1100. Initially, a first DC stage of AC/DC converter 1102 (e.g., DC stage 1112) may be configured by processor 1104 via control 1148 to provide a maximum output voltage (e.g., 250 VDC) as in step 1204, which may then be applied to a first LED string (e.g., LED string 1122 in a current-limited fashion). In one embodiment, for example, processor 1104 may select switch 1118 to the position shown via control 1148 and FET 1150 may be momentarily rendered conductive by processor 1104 via control 1154 (e.g., as in step 1206). In response, a current may or may not be conducted by resistor 1126, as may be sensed by current sensor 1162 of processor 1104, to determine whether or not LED string 1122 exists within lighting system 1100. A voltage developed across resistor 1126, for example, may lead to the determination that a particular magnitude of current is being conducted by LED string 1122, which may then lead processor 1104 to deduce that LED string 1122 exists within lighting system 1100. Steps 1202-1206 may then be repeated as above (e.g., with the same DC stage or a different DC stage within AC/DC converter 1102) to determine the number of LED strings that may or may not exist within lighting system 1100, the result may then be logged as in step 1208.

For the one or more LED strings that may be detected through execution of steps 1202-1208 by processor 1104, a substantially minimum magnitude of forward voltage may then be empirically determined such that each LED string may be operated at maximum efficiency using the determined minimum magnitude of forward voltage. For example, processor 1104 may first select a continuity mode (as in step 1210), whereby AC/DC converter 1102 may be selected to perform a continuity test to determine the forward voltage required to illuminate all of the LEDs that may exist within a previously detected LED string. A first DC stage of AC/DC converter 1102 (e.g., DC stage 1112) that may correspond to the first detected LED string may first be configured by processor 1104 via control 1148 to provide a maximum output voltage (e.g., 250 VDC) as in step 1212, which may then be applied to the first detected LED string (e.g., LED string 1122 in a current-limited fashion) as discussed above, for example, in relation to step 1206.

In step 1214, the applied voltage may be modulated (e.g., decreased from 250 VDC) by processor 1104 via control 1148 in coarse voltage steps (e.g., 10V steps) until current stops flowing (e.g., as detected by current sense 1162 as the applied voltage is decreased from 250 VDC). The coarse voltage obtained in step 1214 may then be logged by processor 1104 as the minimum coarse voltage magnitude required to illuminate the LED string.

In step 1216, the DC stage may be programmed to the minimum coarse voltage from step 1214 increased by one coarse voltage step and then modulated (e.g., decreased) by processor 1104 via control 1148 in medium voltage steps (e.g., 1V steps) until current stops flowing (e.g., as detected by current sense 1162). The medium voltage obtained in step 1216 may then be logged by processor 1104 as the minimum medium voltage magnitude required to illuminate the LED string.

In step 1218, the DC stage may be programmed to the sum of the minimum coarse voltage from step 1214 and the minimum medium voltage from step 1216 increased by one medium voltage step and then modulated (e.g., decreased) by processor 1104 via control 1148 in fine voltage steps (e.g., 0.1V steps) until current stops flowing (e.g., as detected by current sense 1162). The voltage may then be increased in fine voltage steps (e.g., 0.1 VDC steps) until the current begins to flow again. The fine voltage obtained in step 1218 may then be logged by processor 1104 as the minimum fine voltage magnitude required to illuminate the LED string.

Once steps 1214-1218 have been completed, the minimum forward voltage required to most efficiently illuminate the LED string may have been determined within a minimum voltage resolution (e.g., 0.1 VDC). For example, if the LED string under test contains 72 LEDs where each LED exhibits a forward voltage of 3.1 volts and assuming that the on-resistance of FET 1150 and the resistance of resistor 1126 adds an additional overhead voltage (e.g., 0.5 VDC) to the magnitude of forward voltage required to illuminate LED string 1122, then a minimum forward voltage of approximately 72*3.1+0.5=223.7 VDC (e.g., constituting a coarse voltage magnitude of 220 VDC, a medium voltage magnitude of 3 VDC and a fine voltage magnitude of 0.7 VDC) would be required to illuminate the LED string under test. In such an instance, the first DC stage of AC/DC converter 1102 (e.g., DC stage 1112) corresponding to the first detected LED string of lighting system 1100 may be programmed by processor 1104 via control 1148 to provide approximately 223.7 VDC (perhaps rounding up to 225-230 volts for increased headroom), instead of the maximum output voltage (e.g., 250 VDC), such that the first detected LED string of lighting system 1100 may be operated at the most efficient voltage rail possible (e.g., substantially equal to the sum of forward voltages ($V_f$) of all LEDs in the LED string plus the FET, current sense and miscellaneous voltage overhead) and the current magnitude corresponding to such voltage may be measured (e.g., via current sense 1162) and logged by processor 1104 (e.g., as in step 1220). It should be noted that reduced resolution may be obtained when determining the minimum forward voltage required to most efficiently illuminate the LED string by simply eliminating step 1218 or steps 1218 and 1216.

In an alternate embodiment (e.g., as in step 1224), the applied voltage may be modulated (e.g., increased from 0 VDC) by processor 1104 via control 1148 in coarse voltage steps (e.g., 10V steps) until current begins to flow (e.g., as detected by current sense 1162 as the applied voltage is increased from 0 VDC). The coarse voltage obtained in step 1224 may then be decreased by one coarse voltage step and then logged by processor 1104 as the minimum coarse voltage magnitude required to illuminate the LED string.

In step 1226, the DC stage may be programmed to the minimum coarse voltage from step 1224 and then modulated (e.g., increased) by processor 1104 via control 1148 in medium voltage steps (e.g., 1V steps) until current begins to flow (e.g., as detected by current sense 1162). The medium voltage obtained in step 1226 may be decreased by one medium voltage step and then logged by processor 1104 as the minimum medium voltage magnitude required to illuminate the LED string.

In step 1228, the DC stage may be programmed to the sum of the minimum coarse voltage from step 1224 and the minimum medium voltage from step 1226 and then modulated (e.g., increased) by processor 1104 via control 1148 in fine voltage steps (e.g., 0.1V steps) until current begins to flow (e.g., as detected by current sense 1162). The fine voltage obtained in step 1228 may then be logged by processor 1104 as the minimum fine voltage magnitude required to illuminate the LED string. Once steps 1224-1228 have been completed, the minimum forward voltage required to most efficiently illuminate the LED string may have been determined within a minimum voltage resolution (e.g., 0.1 VDC) similarly as discussed above in relation to steps 1214 to 1218 and the current magnitude corresponding to such voltage may be measured (e.g., via current sense 1162) and logged by processor 1104 (e.g., as in step 1220). It should be noted that reduced resolution may be obtained when determining the minimum forward voltage required to most efficiently illuminate the LED string by simply eliminating step 1228 or steps 1228 and 1226.

In one embodiment, processor 1104 may determine which current stabilization mode to utilize depending upon the results of steps 1210-1220 or steps 1210-1212, steps 1224-1228 and step 1220. For example in step 1230, processor 1104 may compare the optimal forward voltage for each detected LED string. In step 1234, comparison of the optimal forward voltage deduced for each detected LED string may lead to a determination that each optimal forward voltage may be approximately equal and in such an instance, a ballast-based stabilization technique may be selected as in step 1236, whereby each LED string may be operated from the same DC stage of AC/DC converter 1102 and the current in each LED string may be appropriately stabilized by its associated ballast resistor and modulated (e.g., increased or decreased on average over time) by analog control and/or appropriate control of the duty cycle of each power switch associated with each LED string (e.g., FET 1150/duty cycle control 1154 for LED string 1122 and FET 1152/duty cycle control 1156 for LED string 1124).

If, on the other hand, the deduced optimal forward voltages for each detected LED string are not substantially equal, inductor-based current stabilization may instead be selected (e.g., as in step 1238), whereby each LED string may be operated from independent DC stages of AC/DC converter 1102 (e.g., constant current DC stages each set at the optimal forward voltage associated with each LED string) and the current in each LED string may be appropriately stabilized by its associated inductor/diode pair and modulated (e.g., increased or decreased on average over time) by analog control and/or appropriate control of the duty cycle of each power switch associated with each LED string (e.g., FET 1150/duty cycle control 1154 for LED string 1122 and FET 1152/duty cycle control 1156 for LED string 1124).

It should be noted that the inductor (e.g., inductor 1130 or inductor 1134) of an inductor-based current stabilization network may add an additional forward voltage component to the minimum voltage required to operate an LED string. However, since the voltage magnitude of each DC stage of AC/DC converter 1102 may be optimally controlled (e.g., minimized), the magnitude of inductance required by each inductor may be minimized as well (thereby minimizing the physical size of the inductor), since the required inductance magnitude is directly proportional to the voltage developed across the inductor.

In one embodiment, a capacitor (e.g., capacitor 1168 and 1170) may be optionally placed across LED strings 1122 and 1124, respectively, to a reference potential (e.g., ground) in either of a ballast-based or inductor-based current stabilization mode of operation. In a ballast-based mode of operation, for example, the capacitor may be selected for a specific output voltage ripple to maintain a substantially constant output voltage under load transient conditions.

In an inductor-based current stabilization mode of operation, on the other hand, capacitors (e.g., capacitors 1168 and 1170) may interact with inductors (e.g., inductors 1130 and 1134, respectively) to provide AC current filtering, thereby allowing the capacitor to control the ripple current to acceptable levels as required by each LED string while at the same time decreasing the required inductance magnitude, thereby further minimizing the physical size and cost of the inductor. For example, by allowing smaller inductance magnitudes to be selected, the resulting increase in peak-to-peak current ripple may be conducted by each capacitor (e.g., capacitor 1168 and 1170), thereby maintaining the magnitude of current ripple experienced by each LED string (e.g., LED string 1122 and 1124, respectively) to within acceptable limits (e.g., 10% of the DC forward current conducted by each LED string).

It should also be noted that other algorithms may be used to determine the current stabilization technique other than those algorithms depicted in steps 1230-1238. For example, inductor-based current stabilization may be selected by processor 1104 even though the optimal forward voltage for each detected LED string may be approximately equal and operated from the same or different DC stages of AC/DC converter 1102. Conversely, ballast-based current stabilization may be selected by processor 1104 even though the optimal forward voltage for each detected LED string may be substantially unequal and operated from the same or different DC stages of AC/DC converter 1102.

Algorithms defining the operation of lighting system 1100 (e.g., algorithms described by the execution steps of FIG. 12) may, for example, fully reside within processor 1104 (e.g., flash memory that is local to processor 1104). Alternately, such algorithms may fully reside within a network (e.g., wired network 1158 and/or wireless network 1160) whereby execution instructions associated with such algorithms may be received by processor 1104 via wired node 1108 and/or wireless node 1106. Conversely, algorithms defining the operation of lighting system 1100 (e.g., algorithms described by the execution steps of FIG. 12) may be distributed to partially reside within processor 1104 and partially reside within a network (e.g., wired network 1158 and/or wireless network 1160) whereby a portion of execution instructions may be received by processor 1104 via wired node 1108 and/or wireless node 1106.

In operation, the status of lighting system 1100 may be continuously monitored and such status may be relayed to wired network 1158 and/or wireless network 1160 via wired node 1108 and/or wireless node 1106, respectively. As per one example, processor 1104 may continuously monitor the current conducted by each LED string (e.g., LED strings 1122, 1124 and/or 1138 as may be measured by current sense 1162, 1164 and/or 1166, respectively) to determine whether each LED string is operating in accordance with the logged current magnitudes for each LED string (e.g., as logged by step 1220 of FIG. 12). A detected fault (e.g., zero conducted current) in one LED string, for example, may result in the deactivation of at least the faulted LED string and perhaps the remaining LED strings by causing the associated voltage and current regulation devices (e.g., FETs 1150 and/or 1152) to remain non-conductive (e.g., via control signals 1154 and 1156, respectively). Such detected faults and subsequent actions taken by processor 1104 may then be reported (e.g., via wired network 1158 and/or wireless network 1160) to allow maintenance personnel to react to the reported fault (e.g., decommissioning of the faulted lighting system and the subsequent commissioning of a replacement lighting system).

In alternate embodiments, trends of each LED string may be tracked to predict, for example, efficiency, maximum light output, peak wavelength and spectral wavelength variations due to increased junction temperature. Increased junction temperatures, for example, may be related to a forward voltage decrease of a particular LED string due to a reduction in the bandgap energy of the active region of each LED in the LED string as well as a decrease in the series resistance of each LED occurring at high temperatures. Accordingly, for example, by tracking a reduced forward voltage of a particular LED string over time, predictions may be made and reported by processor 1104 (e.g., via wired network 1158 and/or wireless network 1160) as to certain performance parameters of each LED string so that maintenance personnel may respond accordingly.

Figure 13:
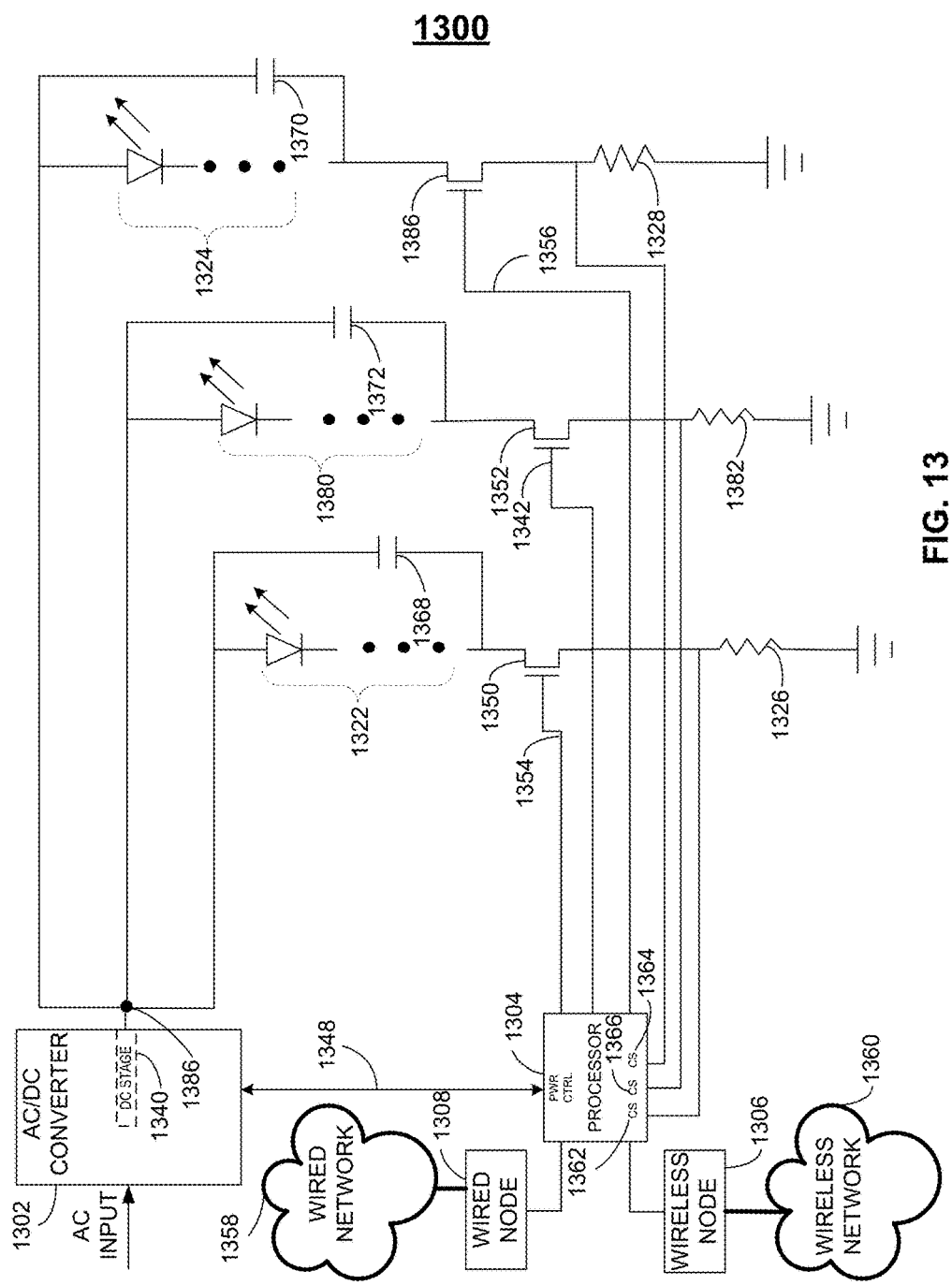
FIG. 13 illustrates a lighting system in accordance with an alternate embodiment of the present invention.

Turning to FIG. 13, an alternate embodiment of lighting system 1300 is exemplified, such that the current stabilization topologies may not be selectable and may instead be provided as ballast-based current stabilization networks for each LED string utilized within lighting system 1300. In addition, a single DC stage 1340 may be utilized within AC/DC converter 1302, which may provide a single-rail voltage magnitude in a constant-current mode of operation to multiple LED strings connected in a parallel configuration (e.g., LED strings 1322, 1324 and 1380).

Similarly as discussed above in relation to FIG. 11, wired node 1308 may include any wired interface (e.g., DMX, I2C, Ethernet, USB, DALI, etc.) that may be used to configure lighting system 1300 (e.g., via processor 1304) for operation and/or allow processor 1304 to communicate the status and operational capability of lighting system 1300 to wired network 1358 (e.g., BACnet-enabled wired network 1358). Similarly, wireless node 1306 may include any wireless interface (e.g., Wi-Fi, thread-based mesh, Bluetooth, ZigBee, etc.) that may similarly be used to configure lighting system 1300 (e.g., via processor 1304) for operation and/or allow processor 1304 to communicate the status and operational capability of lighting system 1300 to wireless network 1360 (e.g., BACnet-enabled wireless network 1360).

The number of series-connected LEDs (e.g., one or more) in each LED string (e.g., 1322, 1324 and 1380) may be selected based upon the sum of forward voltage ($V_f$) of each series-connected LED, where the forward voltage of each LED string may be selected to be substantially equal. In one embodiment, for example, an LED string may be selected to contain about 45 to 50 (e.g., 46) LEDs each having a $V_f$ between about 2.5V and 3.5V (e.g., 3V) for a cumulative forward voltage of 46*3=138V for the LED string. In an alternate embodiment, for example, an LED string may be selected to contain about 60 to 75 (e.g., 69) LEDs each having a $V_f$ between about 1.5V and 2.5V (e.g., 2V) for a cumulative forward voltage of 69*2=138V for the LED string.

In alternate embodiments, each LED string may have the same or a different number of LEDs, but due to differences in $V_f$ for each LED type in each LED string, each LED string may exhibit a forward voltage that is substantially equal to the forward voltage of each of the other LED strings. Furthermore, while only three LED strings are depicted, any number of LED strings (e.g., 4) may be utilized. Still further, each of LED strings 1322, 1324 and 1380 may reside within a single lighting fixture or may reside within multiple lighting fixtures.

Due to slight deviations in the $V_f$ for each LED of each LED string (e.g., due to forward current deviations in each LED string), the cumulative forward voltage for each LED string may not necessarily conform to the calculations above, which may necessitate the existence of ballast elements (e.g., resistor 1326, 1328 and 1382) such that the voltage magnitude at node 1386 may be allowed to remain substantially equal under all load conditions for each LED string. Furthermore, each ballast element may facilitate current stabilization as well as current sense measurements by processor 1304 as discussed in more detail below.

Processor 1304 may be configured to deduce the number of LED strings that may be under its control as well as the forward current requirements (e.g., minimum and maximum forward current) in each LED string. Such deduction, for example, may occur each time lighting system 1300 is provisioned with LEDs, either at initial deployment or after reconfiguration.

Figure 14:
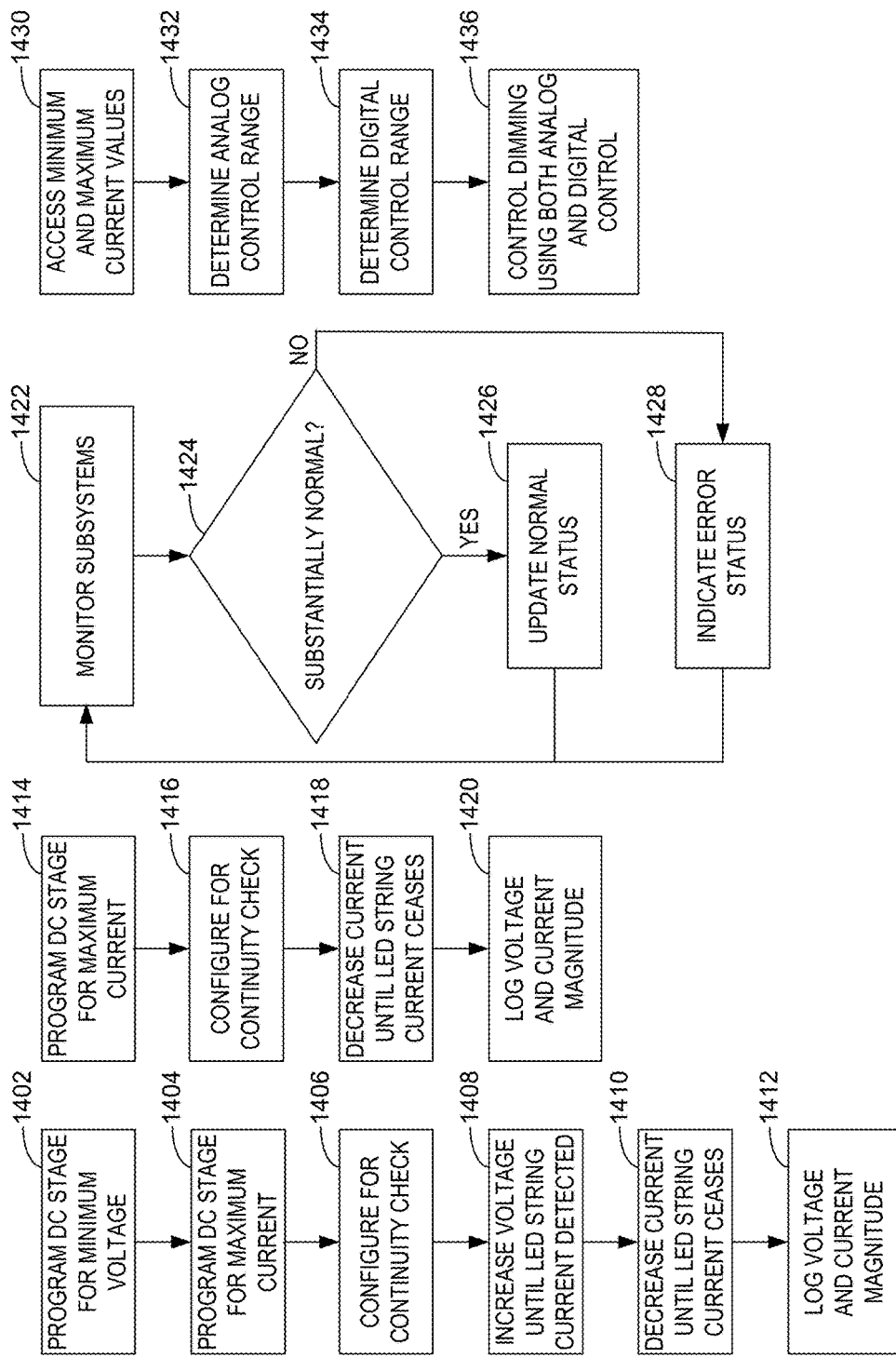
FIG. 14 illustrates flow diagrams in accordance with several alternate embodiments of the present invention.

Turning to FIG. 14, flow diagrams are exemplified whereby processor 1304 may first discover the number of LED strings initially provisioned and/or reconfigured within lighting system 1300. Next, processor 1304 may then configure the current provisioning for each LED string of lighting system 1300.

In a first embodiment, processor 1304 may have control of both the voltage and current magnitude output of DC stage 1340 via control 1348. In such an instance, processor 1340 may configure DC stage 1340 to its minimum voltage output (e.g., as in step 1402) and its maximum current output (e.g., as in step 1404). Processor 1340 may then configure lighting system 1300 for a continuity check (e.g., as in step 1406) whereby, for example, processor 1304 may render one of LED strings 1322, 1380 and 1324 conductive by transitioning one of power switches (e.g., FETs 1350, 1352 or 1386, respectively), into a conductive state. In step 1408, the output voltage magnitude of DC stage 1340 may be increased (e.g., as in steps 1224 through 1228 of FIG. 12) until current is conducted through the LED string under test (e.g., as may be detected by current sense 1362, 1366 or 1364, respectively). Processor 1304 may then decrease the current conducted by the LED string under test via control 1348 by programming the current output of DC stage 1340 to decreasingly lower magnitudes (e.g., in 1 mA steps decreasing from the maximum current set in step 1404) until current ceases to flow (e.g., as in step 1410). In step 1412, for example, processor 1304 may then log the minimum voltage and current magnitudes as measured by steps 1408 and 1410 into a memory location (e.g., as located on-board processor 1304 and/or as may be located in memory locations of wired network 1358 and/or wireless network 1360).

In an alternate embodiment, processor 1304 may program the current magnitude output of DC stage 1340 via control 1348, but DC stage 1340 may internally adjust the output voltage as required to produce the programmed current magnitude output of DC stage 1348. In such an instance, processor 1340 may configure DC stage 1340 to its maximum current output (e.g., as in step 1414). Processor 1340 may then configure lighting system 1300 for a continuity check (e.g., as in step 1416) whereby, for example, processor 1304 may render one of LED strings 1322, 1380 and 1324 conductive by transitioning one of power switches (e.g., FETs 1350, 1352 or 1386, respectively), into a conductive state. The output voltage magnitude of DC stage 1340 may then be internally increased (e.g., increased by circuitry located internal to DC stage 1340) until current is conducted through the LED string under test (e.g., as may be detected by current sense 1362, 1366 or 1364, respectively). Processor 1304 may then decrease the current conducted by the LED string under test via control 1348 by programming the current output of DC stage 1340 to decreasingly lower magnitudes (e.g., in 1 mA steps decreasing from the maximum current set in step 1414) until current ceases to flow (e.g., as in step 1418). In step 1420, for example, processor 1304 may then log the minimum voltage (e.g., as may be reported by DC stage 1340 to processor 1304 via control 1348) and current magnitudes (e.g., minimum and maximum current magnitudes) as measured by step 1418 into a memory location (e.g., local to processor 1304 and/or as may be located in memory locations of wired network 1358 and/or wireless network 1360).

Once the initial configuration of each LED string is complete and lighting system 1300 is operational, each subsystem of lighting system 1300 may be monitored (e.g., as in step 1422) to, for example, continuously determine the operational status of lighting system 1300. For example, each LED string of lighting system confirmed to be operational (e.g., as in steps 1402-1412 or steps 1414-1420) may be continuously monitored (e.g., the forward current of each LED string may be continuously monitored) for normal operation. If the measured forward current substantially equals the current magnitudes as logged in steps 1412 or 1420 taking into account any digital current modulation performed by power switches (e.g., FETs 1350, 1352 and/or 1386), such as reduced forward current through less than 100% duty cycle modulation of the power switches, then normal status of lighting system 1300 may be reported (e.g., as in step 1426). If, on the other hand, the modulated forward current does not meet previously verified current magnitudes, then abnormal status of lighting system 1300 may be reported (e.g., as in step 1428) and reported to, for example, wired network 1358 and/or wireless network 1360 to alert maintenance personnel of the abnormal status.

Other operational aspects of lighting system 1300 may be monitored as well. For example, temperature sensors and fans (e.g., temperature sensors 1016 and fans 1014 as exemplified in FIG. 10) may be utilized by lighting system 1300 to ensure that, for example, the temperature of each LED string is operating within specification. If not, the abnormal temperature and/or fan malfunction may be reported as in step 1428; otherwise, normal fan and temperature status may be reported as in step 1426.

Processor 1304 may implement a hybrid dimming scheme, whereby both digital modulation of LED string current (e.g., via PWM control of the power switches) and analog modulation of LED string bias current may be used to provide deep dimming control of the LED string intensity while minimizing audible and radiated noise. In step 1430, for example, the minimum and maximum current magnitudes (e.g., as determined in steps 1414 and 1418) may be accessed by processor 1304 to determine the full range of DC bias current magnitudes (e.g., as produced by DC stage 1340) that may be utilized to illuminate a particular LED string (e.g., LED string 1322) across a range of intensity. As per one example, the maximum current for an LED string (e.g., LED string 1322) may be determined to be equal to an upper current limit (e.g., 1.25A as determined in step 1414 so that LED string 1322 may produce full intensity), whereas the minimum current for the LED string may be determined to be equal to a percentage of the upper current limit (e.g., 30% of 1.25 A or 0.375 A).

In step 1432, processor 1304 may determine the range over which analog control of the current magnitude may be used to select a particular intensity of light emission from a particular LED string. In one embodiment, for example, processor 1304 may determine that for all current magnitudes conducted by an LED string (e.g., LED string 1322) between a maximum current magnitude and a minimum threshold current magnitude (e.g., 30% of the maximum current magnitude), analog control (e.g., the bias current magnitude provided by DC stage 1340 as commanded by control 1348) may be used. That is to say for example, that for light intensities produced by LED string 1322 between a maximum intensity and a lower threshold intensity (e.g., 30% of maximum intensity), processor 1304 may command DC stage 1340 to the desired bias current magnitude via control 1348 as required to produce the desired intensity range (e.g., 1.25A of bias current for maximum intensity and 0.375 A of bias current for 30% intensity). Variation between maximum intensity and the lower threshold intensity may be accomplished through variation of the bias current generated by DC stage 1340 via control 1348 from processor 1304 in programmable steps (e.g., 1 mA steps).

In step 1434, processor 1304 may determine the range over which digital control of the current magnitude may be used to select a particular intensity (e.g., below the lower threshold intensity) of light emission from a particular LED string. In one embodiment, for example, processor 1304 may determine that for all current magnitudes conducted by an LED string (e.g., LED string 1322) between the lower threshold intensity (e.g., 30% of maximum intensity) and a minimum intensity (e.g., 1% of maximum intensity), digital control (e.g., PWM modulation of FET 1350) may be used to select any number (e.g., 256) of PWM duty cycle variations to modulate the minimum bias current generated by DC 1340 between an average bias current required to produce the lower threshold intensity and an average bias current required to produce the minimum intensity.

In step 1436, dimming may be adjusted through a combination of both analog and digital controls. As per one example, analog control of light intensities produced by an LED string (e.g., LED string 1322) between a maximum intensity and a lower threshold intensity (e.g., 30% of maximum intensity) may be accomplished via appropriate control of DC stage 1340 via control 1348 to generate bias current magnitudes required to produce intensities between the maximum intensity (e.g., 1.25 A bias current magnitude) and the lower threshold intensity (e.g., 0.375 A bias current magnitude) in programmable current steps (e.g., 1 mA steps) for an intensity control granularity substantially equal to, for example, (0.001/(1.25−0.375))*100=0.1%. As per the same example, digital control of light intensities produced by an LED string (e.g., LED string 1322) between the lower threshold intensity (e.g., 30% of maximum intensity) and a minimum intensity (e.g., 1% of maximum intensity) may be accomplished via appropriate modulation of the lower threshold bias current generated by DC stage 1340 via PWM control 1354 to produce programmable light intensities below the lower threshold intensity. In one embodiment, for example, 256 DMX control values via wired node 1308 may be used to vary the intensity between the lower threshold intensity (e.g., 30% of maximum intensity) and the minimum intensity (e.g., 1% of maximum intensity) with a control granularity substantially equal to (30%-1%)/256=0.1%.

Through implementation of PWM control only over the lower portion of the current control range (e.g., the lower 30% of the current control range), fidelity may be improved within that range by, for example, reducing conducted emissions, reducing radiated emissions and reducing audible noise pollution. Furthermore, color mixing control across all LED strings (e.g., LED strings 1322, 1380 and 1324) may be enhanced through the application of digital dimming control beyond the limitations conventionally imposed by analog dimming, which for example, may deteriorate when analog dimming is attempted below a threshold dimming percentage (e.g., 10% of maximum intensity). Furthermore, by limiting the digital dimming control to lower levels of intensity (e.g., 1% to 30% of maximum intensity), the frequency of the PWM control waveform may be increased to frequencies above about 20 kHz (e.g., between about 20 kHz and 1 MHz) that may be less prone to generate detectable flicker and shimmer thereby further enhancing dimming fidelity.

In one embodiment, processor 1304 may determine that DC stage 1340 may not provide a magnitude of current that may be required by each of LED strings 1322, 1324 and 1380 operating at 100% intensity or lower. In such an instance, processor 1304 may implement a current sharing algorithm whereby each of the LED strings 1322, 1380 and 1324 may be operated at a percentage intensity that may be accommodated by DC stage 1340. For example, DC stage 1340 may only be capable of providing an upper limit of current magnitude (e.g., 1.2A) and in such and instance, processor 1304 may apportion a percentage of the upper limit current magnitude to each of LED strings 1322, 1380 and 1324 as may be necessary using analog control, digital control or a combination of analog and digital control as discussed above.

It should be noted that any one LED string may be apportioned 100% of the available current from DC stage 1340 using the current sharing algorithm. Conversely, any number of LED strings may share any portion of the available current from DC stage 1340. As per one example, each LED string may equally share in the available current, whereby the magnitude of current apportioned to any one LED string may be calculated as the maximum current available divided by the number of activated LED strings (e.g., three activated LED strings may each receive 0.4 A of the available 1.2 A from DC stage 1340) by any of an analog, digital or combination of analog/digital current control algorithm as discussed above.

In an alternate embodiment, for example, processor 1304 may determine that DC stage 1340 may provide a magnitude of current that may meet or exceed the requirement of any one or more LED strings 1322, 1324 and 1380 operating at 100% intensity or lower. In such an instance, processor 1304 may implement a current provisioning algorithm whereby any one or more of the LED strings 1322, 1380 and 1324 may be operated at a commanded percentage intensity using a combination of analog and/or digital current control as discussed above.

As per one example, DC stage 1340 may be commanded to a current magnitude of 1.2 A, but each of LED strings 1322, 1380 and 1324 may only require 0.4 A on average via appropriate PWM control of their associated power switches (e.g., FETs 1350, 1352 and 1386, respectively) to operate at their respective commanded intensity. In such an instance, 1.2 A may be conducted instantaneously by any one LED string 1322, 1380 and 1324 at a time (e.g., only one of LED strings 1322, 1380 and 1324 may be conductive at any given time), but through time division multiple access (TDMA) control, each LED string may be operating at 33% duty cycle to receive only the required 0.4 A on average to operate at its commanded intensity. It should be noted that through analog and/or digital current control and proper time division multiple access to such controlled current, any one LED string may operate at any intensity (e.g., 0-100%) at any given time (e.g., any one LED string may be conductive to the mutual exclusion of all of the other LED string conductivity states) to operate on average at the commanded intensity.

Figure 15:
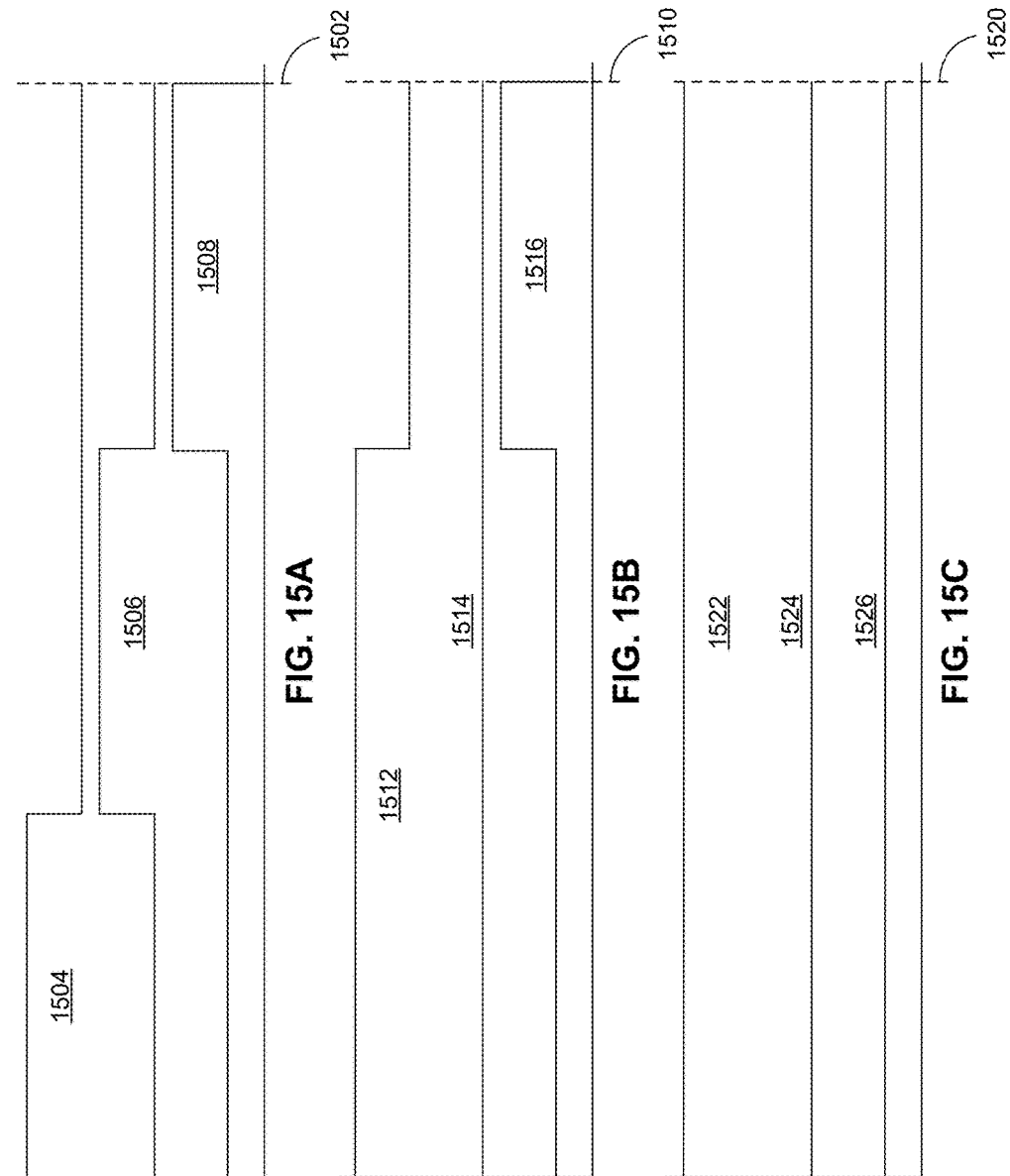
FIG. 15 illustrates timing diagrams in accordance with several embodiments of the present invention.

Examples of such TDMA control are illustrated in FIGS. 15A, 15B and 15C. In FIG. 15A, for example, in any given TDMA period 1502, any LED string (e.g., any of LED strings 1322, 1380 and/or 1324 of FIG. 13) may be allocated a time slot (e.g., time slots 1504, 1506 and 1508, respectively) within which any one LED string may receive any magnitude percentage (e.g., 0-100%) of any of an analog and/or a digitally controlled current signal.

In time slot 1504, for example, processor 1304 may command LED string 1322 to conduct a percentage (e.g., 100%) of the maximum available current by causing a maximum magnitude of bias current from a corresponding DC stage (e.g., DC stage 1340) to be conducted by LED string 1322. Capacitor 1368 may, for example, be utilized to extend the on-time of LED string 1322 by allowing the current conducted at the end of time slot 1504 to decay into the beginning of time slot 1506 in accordance with the RC time constant created by capacitor 1368 in combination with the resistance of each LED in LED string 1322. In such an instance, for example, the light emitted by LED string 1322 at the end of time slot 1504 may be blended with the light emitted by LED string 1380 at the beginning of time slot 1506 so as to implement true mixing of the light emitted by LED string 1322 with the light emitted by LED string 1380 across the end of time slot 1504 and into the beginning of time slot 1506.

In time slots 1506 and 1508, LED strings 1380 and 1324, respectively, may similarly be programmed to receive analog and/or digitally controlled current signals so that a percentage (e.g., 100%) of the maximum available current from DC stage 1340 may be received by each of LED strings 1380 and 1324 in their respective time slots. Capacitors 1372 and 1370 may, for example, be similarly utilized to extend the on-time of LED strings 1380 and 1324, respectively, by allowing the current conducted at the end of time slot 1506 to decay into the beginning of time slot 1508 and by allowing the current conducted at the end of time slot 1508 to decay into the beginning of time slot 1504 in accordance with the RC time constants created by capacitors 1372 and 1370, respectively, in combination with the resistance of each LED in LED strings 1380 and 1324, respectively. In such an instance, for example, the light emitted by LED string 1380 at the end of time slot 1506 may be blended with the light emitted by LED string 1324 at the beginning of time slot 1508 and the light emitted by LED string 1324 at the end of time slot 1508 may be blended with the light emitted by LED string 1322 at the beginning of time slot 1504.

It should be noted that since each of LED strings 1322, 1380 and 1324 receive a maximum bias current magnitude in each of respective time slots 1504, 1506 and 1508 and since each of time slots 1504, 1506 and 1508 are of equal time duration, the average amount of current conducted by each of LED strings 1322, 1380 and 1324 over multiple time periods 1502 is substantially equal to about ⅓ the maximum current available from DC stage 1340.

It should be further noted that current conducted by LED strings 1322, 1380 and 1324 in each of time slots 1504, 1506 and 1508, respectively, may be modulated (e.g., pulse width modulated) to further reduce the average amount of current conducted over time. As discussed above, for example, any one of 256 duty cycle selections may be made by processor 1304 such that the amount of current conducted by each LED string 1322, 1380 and 1324 in each time slot 1504, 1506 and 1508, respectively, may be further reduced on average by the duty cycle selection of control signals 1354, 1342 and 1356, respectively.

Turning to FIG. 15B, in any given TDMA period 1510, any one or more LED strings (e.g., any of LED strings 1322, 1380 and/or 1324 of FIG. 13) may be denied a time slot (e.g., time slot 1514 does not provide for an active current conduction state within which LED string 1380 may receive current). As per an example, only two time slots (e.g., time slots 1512 and 1516) may be allocated within which any two LED strings (e.g., LED strings 1322 and 1324, respectively) may receive any of an analog and/or a digitally controlled current signal.

In time slot 1512, for example, processor 1304 may command LED string 1322 to conduct a percentage (e.g., 100%) of the maximum available current by causing a maximum magnitude of bias current from a corresponding DC stage (e.g., DC stage 1340) to be conducted by LED string 1322. In time slot 1516, LED string 1324 may similarly be programmed to receive an analog and/or digitally controlled current signal so that a percentage (e.g., 100%) of the maximum available current from DC stage 1340 may be received by LED string 1324.

It should be noted that since each of LED strings 1322 and 1324 receive a maximum bias current magnitude in each of respective time slots 1512 and 1516 and since time slot 1512 is twice the duration of time slot 1516, the average amount of current conducted by LED string 1322 over multiple time periods 1510 is substantially equal to about ⅔ the maximum current available from DC stage 1340 and the average amount of current conducted by LED string 1324 over multiple time periods 1516 is substantially equal to about ⅓ the maximum current available from DC stage 1340.

It should be further noted that current conducted by LED strings 1322 and 1324 in each of time slots 1512 and 1516, respectively, may be modulated (e.g., pulse width modulated) to further reduce the average amount of current conducted over time. As discussed above, for example, any one of 256 duty cycle selections may be made by processor 1304 such that the amount of current conducted by each LED string 1322 and 1324 in each time slot 1512 and 1516, respectively, may be further reduced on average by the duty cycle selection of control signals 1354 and 1356, respectively.

Turning to FIG. 15C, in any given TDMA period 1520, any one or more LED strings (e.g., any of LED strings 1322, 1380 and/or 1324 of FIG. 13) may be denied a time slot (e.g., time slots 1524 and 1526 do not provide for an active current conduction state within which LED string 1380 and 1324 may receive current). As per an example, only one time slot (e.g., time slot 1522) may be allocated within which an LED string (e.g., LED string 1322) may receive any of an analog and/or a digitally controlled current signal.

In time slot 1522, for example, processor 1304 may command LED string 1322 to conduct a percentage (e.g., 100%) of the maximum available current by causing a maximum magnitude of bias current from a corresponding DC stage (e.g., DC stage 1340) to be conducted by LED string 1322. It should be noted that since LED string 1322 receives a maximum bias current magnitude in time slot 1522 and since time slot 1522 is the same duration as time period 1520, the average amount of current conducted by LED string 1322 over multiple time periods 1520 is substantially equal to all of the maximum current available from DC stage 1340.

It should be further noted that current conducted by LED string 1322 in time slot 1522 may be modulated (e.g., pulse width modulated) to further reduce the average amount of current conducted over time. As discussed above, for example, any one of 256 duty cycle selections may be made by processor 1304 such that the amount of current conducted by LED string 1322 in time slot 1522 may be further reduced on average by the duty cycle selection of control signal 1354.

Figure 16:
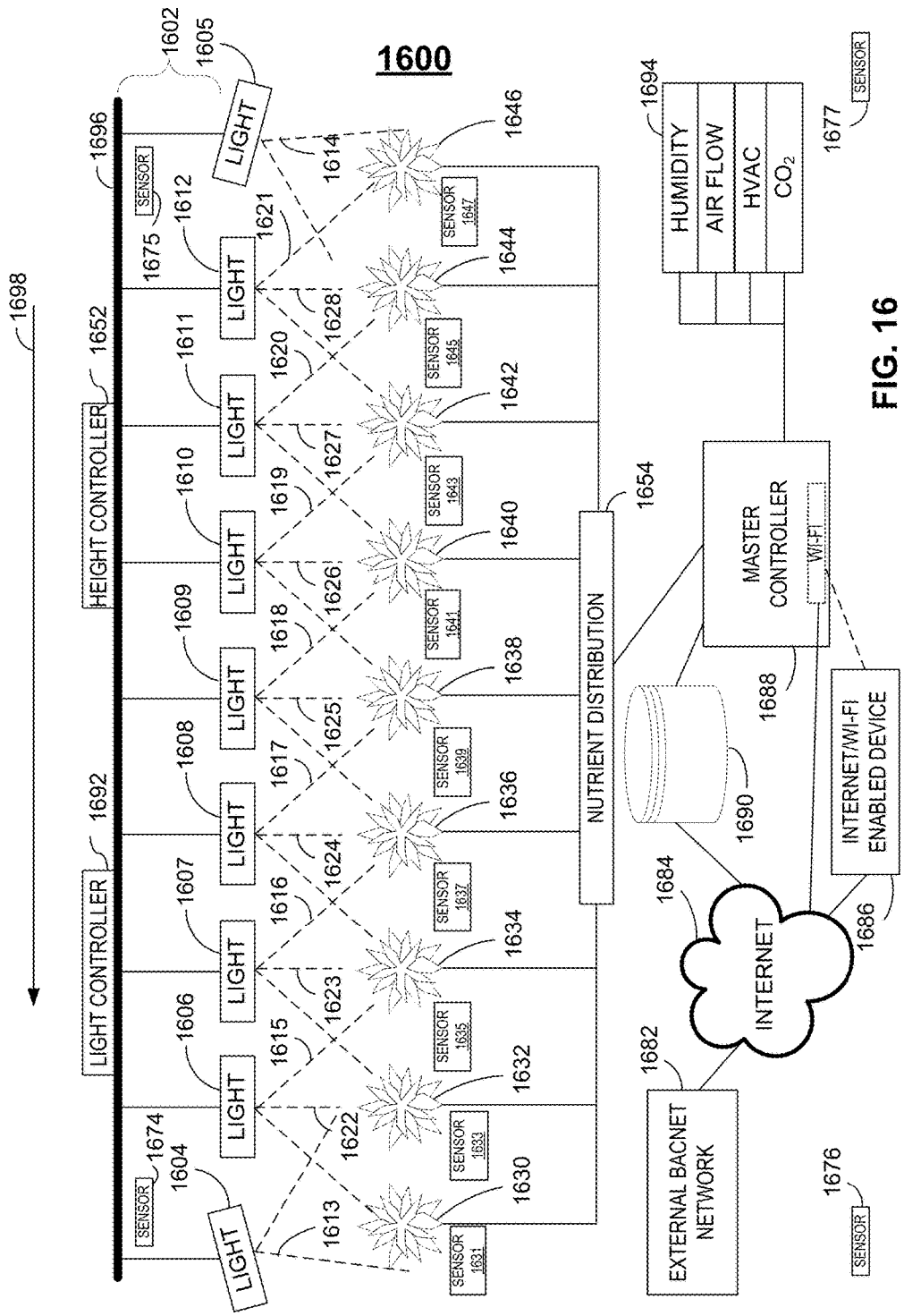
FIG. 16 illustrates an indoor horticultural system in accordance with one embodiment of the present invention.

Turning to FIG. 16, indoor horticultural system 1600 is exemplified, which may include a horticultural lighting system (e.g., horticultural lighting fixtures 1604-1612 as exemplified by the lighting fixtures of FIGS. 1, 9, 10, 11 and/or 13) each implementing any number of wired control topologies (e.g., DMX, I2C, Ethernet, USB, DALI, etc.) and/or any number of wireless control topologies (e.g., Wi-Fi, thread-based mesh, Bluetooth, ZigBee, etc.) that may be utilized to control, for example, intensity, color temperature and/or color spectrum as well as any other attribute of light that may be emitted by the horticultural lighting fixtures.

Indoor horticultural system 1600 may also contain any number of area sensors (e.g., sensors 1674-1677), which may be used to detect, for example, occupancy, room temperature, humidity, etc. and may provide an associated status signal (e.g., thread-based mesh network status signal) that may be indicative of the sensors' status (e.g., temperature reading, humidity level, motion detection, etc.). Plant-based sensors may also be paired with each plant of the grow bed (e.g., plant/sensor pairs 1630/1631 through 1646/1647) so that parameters (e.g., temperature, humidity, light intensity, color temperature, spectral content, moisture, pH, canopy height, etc.) may be sensed for each plant, or group of plants, and reported at regular time intervals via an associated status signal (e.g., thread-based mesh network status signal). It should be noted that each sensor of FIG. 16 may include a computing module (not shown), which may be used to administer communications, conduct sensor measurements and sensor measurement/status reporting and whose operational power may be derived from a solar cell (not shown) and/or internal battery (not shown).

Indoor horticultural system 1600 may also include nutrient distribution 1654 that may provide the nutrients and water that may be required by each plant of each grow bed(s). Nutrient distribution may be implemented as a closed-loop system, whereby nutrients and water may be extracted from their respective storage containers (not shown) and mixed to proper proportions. Once properly mixed, the nutrient solution may be pumped (e.g., at a monitored flow rate) into hydroponic flood benches and/or trough benches (not shown) to be delivered for consumption by each plant of each grow bed that may be contained within indoor horticultural system 1600. Any unused nutrient solution retrieved from nutrient distribution 1654 may be collected, filtered and prepared to be recirculated to the hydroponic flood benches and/or trough benches. Nutrient distribution 1654 may also include sensors (not shown), which may be used to test the collected nutrient flow for any deficiencies and subsequently reported as additional status information which may then be used to adjust (e.g., automatically via master controller 1688) the nutrient/water content for optimized growth of the associated plants in the associated grow beds.

As shown, indoor horticultural system 1600 may include lighting systems that may be included within any facility that may exhibit structural components such as walls (not shown) and ceilings (e.g., ceiling 1696). Each of the lighting fixtures, sensors and associated control elements of indoor horticultural system 1600, therefore, may be deployed within such structural components of the facility as a fixed or permanent asset.

For example, light controller 1692 may be deployed within ceiling 1696 as a fixed asset within indoor horticultural system 1600. Light controller 1692 may, for example, include a DMX master controller (not shown) that may receive wireless commands (e.g., from master controller 1688) and in response, may control the desired intensity of each horticultural light fixture 1604-1612 (e.g., each LED array of each horticultural light fixture 1604-1612) accordingly. In one embodiment, for example, each LED array of each horticultural light fixture 1604-1612 may exist within the same DMX universe and may be responsive to an 8-bit intensity control word received within its uniquely designated DMX slot from light controller 1692.

Other fixed assets within indoor horticultural system 1600 may include, for example, horticultural lighting fixtures 1604-1612 and their associated height control mechanisms (e.g., winch mechanisms that may control the length of cable assemblies 1602). Cable assemblies 1602, for example, may be controlled by a height controller (e.g., height controller 1652) that may be used to raise and lower horticultural lighting fixtures 1604-1612 in accordance with the canopy height of the associated plants (e.g., as may be reported by plant/sensor pairs 1630/1631 to 1646/1647 to master controller 1688). For example, as the plants grow taller, it may be necessary to raise the associated horticultural lighting fixtures 1604-1612 in relation to the extended height of the associated plant canopies.

In one embodiment, each of the horticultural lighting fixtures and associated sensors/controllers of indoor horticultural system 1600 may be interconnected wirelessly (e.g., via a thread-based mesh network). Accordingly, for example, indoor horticultural system 1600 may be implemented as a wireless personal area network (WPAN) utilizing a physical radio layer (e.g., as defined by the IEEE 802.15.4 communication standard). As such, the thread-based mesh network may utilize an encapsulation and header compression mechanism (e.g., 6LoWPAN) so as to allow data packets (e.g., IPv6 data packets) to be sent and received over the physical radio layer. Messaging between each device within indoor horticultural system 1600 may be implemented using a messaging protocol (e.g., user datagram protocol (UDP)), which may be preferred over an alternative protocol such as the transmission control protocol (TCP).

In addition, each device may use an application layer protocol for delivery of the UDP data packets to each device. Such application layer protocols may include the Constrained Application Protocol (CoAP), Message Queue Telemetry Transport (MQTT) or the Extensible Messaging and Presence Protocol (XMPP) within the thread-based mesh network as contrasted with the Hypertext Transport Protocol (HTTP) as may be used, for example, within Internet 1684. CoAP, for example, may be more conducive for use by the thread-based mesh network, rather than HTTP, due to the smaller packet header size required by CoAP, which may then yield smaller overall packet sizes required by the components of indoor horticultural system 1600 interconnected by the thread-based mesh network.

In operation, some components (e.g., horticultural lighting fixtures 1604-1612) interconnected by the thread-based mesh network of FIG. 16 may be connected to an alternating current (AC) source that may be used throughout the facility for use with other components requiring AC power for operation, such as heating, ventilation and air conditioning (HVAC) systems, air circulators, humidifiers/dehumidifiers and $CO_2$ dispensing systems 1694. Furthermore, operational power derived from the AC source may be further controlled (e.g., via relays) so as to be compliant with, for example, the Energy Star® standard for energy efficiency as promulgated jointly by the Environmental Protection Agency (EPA) and the Department of Energy (DOE).

In one embodiment, device 1686 may be used to manually operate indoor horticultural system 1600 wirelessly (e.g., through the use of a thread-based mesh network). For example, device 1686 may send a control signal to light controller 1692 via the thread-based mesh network to cause one or more horticultural lighting fixtures 1604-1612 to illuminate in accordance with a particular light prescription (e.g., intensity, color temperature and/or color spectrum) as may be contained within database 1690. Alternately, device 1686 may send a control signal to height controller 1652 via the thread-based mesh network so as to cause the height between one or more horticultural lighting fixtures 1604-1612 to change with respect to a height of the one or more plant canopies contained within indoor horticultural system 1600. In alternate embodiments, master controller 1688 may completely automate the operation of indoor horticultural system 1600 by accessing grow recipes from database 1690, which may then be used to control the lighting in a specific manner to produce a specific effect (e.g., modify the intensity, color temperature and/or color spectrum of each of horticultural lights 1604-1612 to simulate a rising sun, a midday sun and a setting sun in direction 1698 from east to west).

Indoor horticultural system 1600 may, for example, be sensitive to control signals as may be provided by controlling entities (e.g., external BACnet network 1682) that may exist external to the thread-based mesh network of FIG. 16. As per an example, one or more entities within indoor horticultural system 1600 may be BACnet enabled, which may allow communication with a BACnet enabled border router (e.g., master controller 1688). In such an instance, control signals bound for indoor horticultural system 1600 may be transmitted by external BACnet network 1682 via Internet 1684 and propagated throughout indoor horticultural system 1600 via master controller 1688. Conversely, status information related to indoor horticultural system 1600 may be gathered by master controller 1688 and may then be disseminated to external BACnet network 1682 via Internet 1684. Accordingly, many grow facilities as exemplified by FIG. 16 may exist and may be geographically dispersed and remotely controlled via external BACnet network 1682.

Each of horticultural light fixtures 1606-1612 may, for example, generate relatively wide beam patterns (e.g., beam patterns 1615-1621, respectively) that may be produced by a particular LED/lens combination (e.g., the LED/lens combination as discussed above in relation to FIG. 6), which may produce maximum intensity at the edges of the beam pattern. Accordingly, for example, the resulting light distribution (e.g., the light distribution of FIG. 7A) may produce a uniform illuminance onto a plant canopy directly below each of horticultural light fixtures 1606-1612 (e.g., uniform illuminance distributions 1622-1628) while producing relatively equal intensities on adjacent plants. In alternate embodiments, illuminance distributions 1622-1628 may increase as the angle of incidence increases with respect to the optical axis of illuminance distributions 1622-1628.

As an example, horticultural light 1606 may produce a uniform illuminance, or an increasing illuminance from centerbeam outward (e.g., illuminance 1622) onto a plane that may be defined by the canopy of plant 1632 due to the increasing intensity of light at increasing angles with respect to the optical axis of horticultural light 1606. Since the intensity of light generated by horticultural light 1606 is greatest at the edges of light distribution 1615, plants 1630 and 1634 may receive a substantially equal intensity of light as received by plant 1632 from horticultural light 1606 owing to the effects of the inverse square law as discussed above. In such an instance, each plant may not only receive a uniform illuminance, or an increasing illuminance from centerbeam outward, onto its canopy by an associated horticultural light fixture, but may also receive substantially equal intensities of light on the sides of the plant by adjacent horticultural light fixtures, thereby more correctly simulating sunlight, since light is being received by each plant from multiple angles. It should be noted that horticultural light fixtures 1604-1612 may be arranged not only as a linear-array, but as a two-dimensional array (e.g., arranged along rows and columns) such that each plant may receive light from its associated horticultural light fixture and adjacent horticultural light fixtures at all angles formed from a 360-degree light distribution (e.g., each plant may receive a substantially uniform cone of light from its associated and adjacent horticultural light fixtures).

Plants on the edge of each grow bed (e.g., plants 1630 and 1646) may receive light from their associated horticultural lighting fixtures configured at angles that are different than the angles of horticultural lighting fixtures 1606-1612. For example, horticultural lighting fixtures 1604 and 1605 may be angled (e.g., via height controller 1652 and associated cable assemblies 1602) as shown to direct light onto their associated plants (e.g., plants 1630 and 1646, respectively) as well as the adjacent plants (e.g., plants 1632 and 1644, respectively). In addition, each of horticultural light fixtures 1604-1605 may, for example, generate relatively narrow beam patterns (e.g., beam patterns 1613-1614, respectively) that may be produced by a particular LED/lens combination (e.g., the LED/lens combination as discussed above in relation to FIG. 3), which may similarly produce maximum intensity at the edges of the beam pattern as discussed above in relation to FIGS. 4A and 4B so as to illuminate adjacent plants (e.g., 1632 and 1644, respectively) with substantially the same intensity as associated plants 1630 and 1632, respectively.

In alternate embodiments, each of horticultural light fixtures 1604-1612 may, for example, generate relatively wide beam patterns (e.g., beam patterns 1613-1621, respectively) that may be produced by bare LEDs (e.g., standard LED packages producing a Lambertian beam pattern without an associated lens) where each bare LED may be mounted at varying angles with respect to one another. In such an instance, for example, a first bare LED may be mounted within a light fixture (e.g., light fixture 1606) such that the optical axis of the first LED may align with a light distribution (e.g., light distribution 1622) that may be directed toward a target (e.g., plant 1632). Second and third bare LEDs may alternately be mounted within a light fixture (e.g., light fixture 1606) at opposing angles such that the optical axes of the first and second bare LEDs may align with the edges of a light distribution (e.g., light distribution 1615). For example, a second bare LED may be mounted within light fixture 1606 such that its optical axis may be directed at its respective target (e.g., plant 1630) and a third bare LED may be mounted within light fixture 1606 such that its optical axis may be directed at its respective target (e.g., plant 1634). Accordingly, light fixture 1606 may, for example, not only provide direct lighting to plant 1632, but may also provide cross-lighting for adjacent plants 1630 and 1634 without the use of lenses that may optically vary the light distributed by light fixture 1606.

Figure 17:
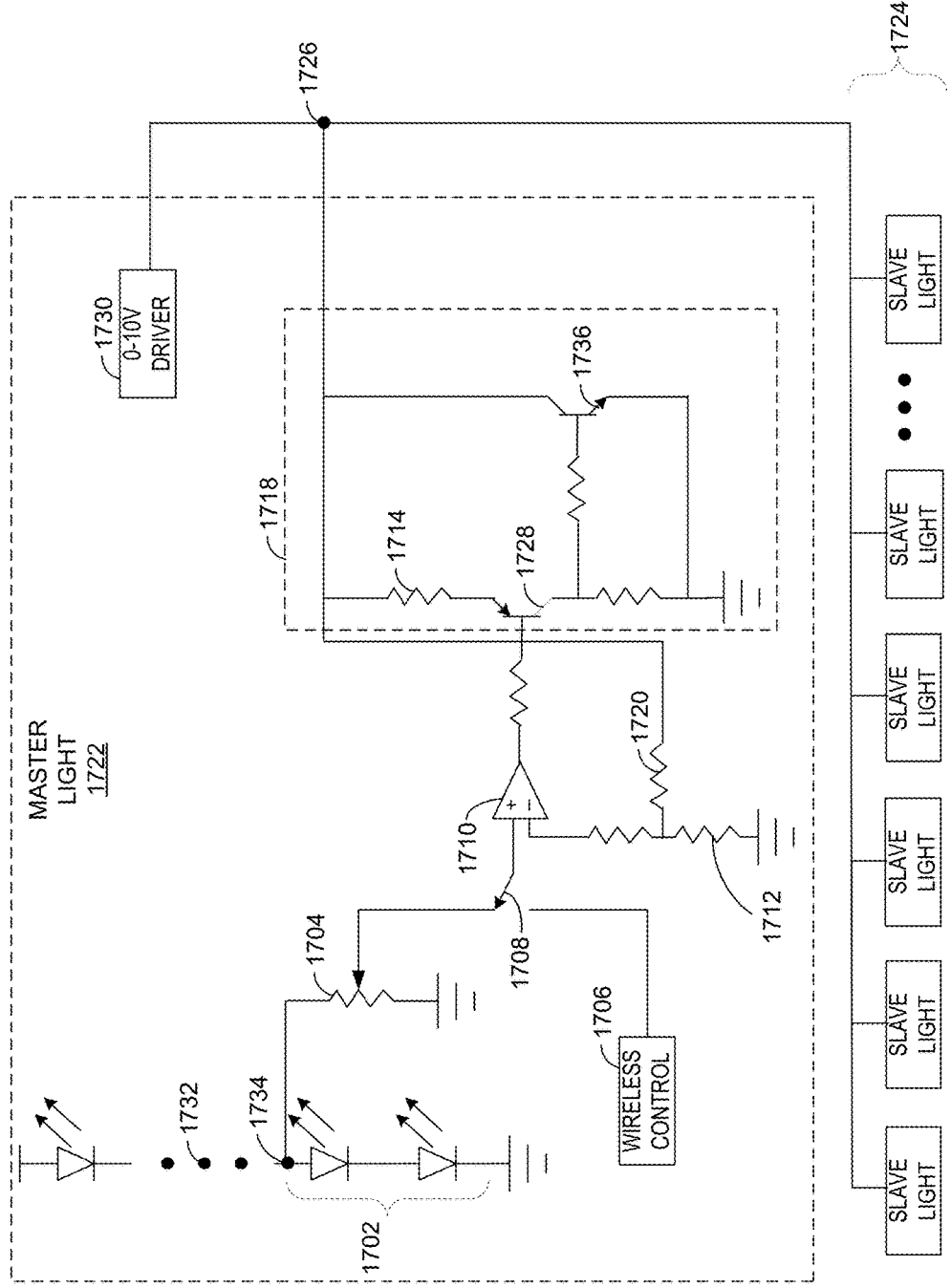
FIG. 17 illustrates a schematic diagram that extracts power from a portion of an LED string to implement an auxiliary function in accordance with one embodiment of the present invention.

Turning to FIG. 17, a schematic diagram of a lighting system is exemplified, whereby the forward voltage of one or more LEDs of an LED string of a light fixture (e.g., master light fixture 1722) may be utilized as a relatively low-current power supply for auxiliary purposes (e.g., to provide a 0-10V dimming controller without the need for a dedicated 0-10V controller power supply). For example, the forward voltage of several LEDs (e.g., two LEDs 1702) may combine in series to form a cumulative forward voltage equal to the sum of the individual forward voltage of each LED (e.g., 2*6=12 volts at node 1734) and may be used as an auxiliary supply voltage. The impedance of a rheostat (e.g., potentiometer 1704) may be selected such that very little current may be derived from the LED string at node 1734 while allowing a variable voltage to be selected manually (e.g., by an operator in control of potentiometer 1704) and applied to the non-inverting input of operational amplifier 1710. In one embodiment, switch 1708 may be implemented as a removable, hard-wired selector (e.g., PCB jumper) that may allow the wiper voltage of potentiometer 1704 to be applied to operational amplifier 1710.

In operation, operational amplifier 1710 may seek to maintain the voltage at its inverting input substantially equal to the voltage at its non-inverting input through operation of negative feedback applied to its inverting input as shown. As such, the conductive state of transistor 1728 may be selected by operational amplifier 1710 (e.g., through selection of the voltage, $V_b$, applied to the base terminal of transistor 1728) such that the voltage at node 1726 (e.g., a 0-10V control voltage, $V_{CTRL}$) may be maintained to be proportional to the voltage selected by potentiometer 1704 ($V_{POT}$) according to voltage follower equation (1):

$$V_{CTRL} = V_{POT}\left(1 + \frac{R_{1720}}{R_{1712}}\right), \quad (1)$$

where $R_{1720}$ is the resistance magnitude of resistor 1720 and $R_{1712}$ is the resistance magnitude of resistor 1712. Writing $V_{CTRL}$ in terms of the current ($I_{1728}$) conducted by transistor 1728:

$$V_{CTRL} = V_b + I_{1728} R_{1714} + V_{EB}, \quad (2)$$

where $R_{1714}$ is the resistance magnitude of resistor 1714 and $V_{EB}$ is the emitter-base voltage of transistor 1728 and combining equation (1) with equation (2):

$$I_{1728} = \frac{V_{POT}\left(1 + \frac{R_{1720}}{R_{1712}}\right) - V_b - V_{EB}}{R_{1714}}, \quad (3)$$

it can be seen from equation (3) that the magnitude of current conducted by transistor 1728, $I_{1728}$, may be directly dependent upon the base voltage, $V_b$, of transistor 1728 as applied by operational amplifier 1710. Turning back to equation (1), the voltage at node 1726 ($V_{CTRL}$) follows the voltage selected by potentiometer 1704 ($V_{POT}$) as modified by the gain constant ($1+R_{1720}/R_{1712}$) and the current conducted by current sink 1718 may be adjusted (e.g., increased) by adjusting (e.g., decreasing) the base voltage, $V_b$, of transistor 1728 via operational amplifier 1710. As the voltage at node 1726, $V_{CTRL}$, decreases below a threshold voltage magnitude, shunt transistor 1736 may be utilized to shunt the voltage at node 1726, $V_{CTRL}$, to a reference voltage (e.g., the collector-emitter voltage of transistor 1736 referenced to ground potential) so as to extend the voltage control range at node 1726 below that which may be accommodated by transistor 1728.

Master light fixture 1722 (e.g., via 0-10V driver 1730) and slave light fixtures 1724 may be configured with 0-10V drivers that may source current into node 1726 and may derive their intensity control signal, $V_{CTRL}$, from node 1726 as well. As the number of slave light fixtures 1724 increases, so may the current magnitude conducted by current sink 1718. Through operation of equation (3) as discussed above, it can be seen that an increase in current conducted by current sink 1718 (e.g., as may be required through the addition of slave light fixtures 1724 and master light fixture 1722) may be accommodated by a corresponding decrease in base voltage, $V_b$. Accordingly, the number of slave light fixtures and master light fixture that may be accommodated by current sink 1718 may be directly proportional to the current conduction capability of current sink 1718. In one embodiment, for example, the current conduction capability of current sink 1718 may be selected to be approximately 50 mA, which may then accommodate up to 99 slave light fixtures (and one master light fixture 1722), such that up to 100, 0-10V drivers may each source 500 uA of current into node 1726.

In an alternate embodiment, switch 1708 (e.g., a PCB jumper) may be selected such that a wireless control module (e.g., wireless control 1706) may instead control the voltage at the non-inverting input of operational amplifier 1710, which may then control the voltage at node 1726, $V_{CTRL}$, as discussed above. It can be seen, therefore, that the intensity of multiple lights within an indoor horticultural system (e.g., horticultural lights 1604-1612 of indoor horticultural system 1600 of FIG. 16) may be controlled by a light controller (e.g., light controller 1692 of FIG. 16) operated either through manual control (e.g., potentiometer 1704) or through wireless control (e.g., wireless control 1706) such that all horticultural lights 1604-1612 may be operated at substantially equal intensities via a single control input.

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. A horticultural system, comprising:
    a light having a plurality of arrays of LEDs wherein each of the plurality of arrays of LEDs are configured in rows, the plurality of rows of LEDs including,
        a first row of broad-spectrum white LEDs exhibiting a first color temperature;
        a second row of broad-spectrum white LEDs exhibiting a second color temperature; and
        one or more rows of fixed-color LEDs;
    a controller coupled to each row of the plurality of rows of LEDs, wherein each row of LEDs is controlled by the controller to produce a light spectrum exhibiting a third color temperature tunable between the first and second color temperatures;
    a light prescription database coupled to the controller; and
    a sensor coupled to the controller and configured to provide measurements indicative of the third color temperature, wherein the controller is configured to control an intensity of the plurality of rows of LEDs to maintain the third color temperature within constraints defined by the light prescription database.

2. The horticultural system of claim 1, wherein the one or more rows of fixed-color LEDs include LEDs that emit different wavelengths of light.

3. The horticultural system of claim 2, wherein the one or more rows of fixed-color LEDs includes a row of blue LEDs that emit light having 440 nm and 460 nm wavelengths.

4. The horticultural system of claim 3, wherein a first portion of the blue LEDs emit light having a 440 nm wavelength and a second portion of the blue LEDs emit light having a 460 nm wavelength.

5. The horticultural system of claim 4, wherein the first portion includes a first half of the blue LEDs and the second portion includes a second half of the blue LEDs.

6. The horticultural system of claim 2, wherein the one or more rows of fixed-color LEDs includes a row of red LEDs that emit light having 625 nm and 660 nm wavelengths.

7. The horticultural system of claim 6, wherein a first portion of the red LEDs emit light having a 625 nm wavelength and a second portion of the red LEDs emit light having a 660 nm wavelength.

8. The horticultural system of claim 7, wherein the first portion includes a first half of the red LEDs and the second portion includes a second half of the red LEDs.

9. A horticultural system, comprising:
a light having a plurality of rows of LEDs including,
a first row of broad-spectrum white LEDs exhibiting a first color temperature;
a second row of broad-spectrum white LEDs exhibiting a second color temperature;
a third row of broad-spectrum white LEDs exhibiting a third color temperature;
a single row of fixed-color LEDs; and
a controller coupled to each row of the plurality of rows of LEDs, wherein an intensity of each row of LEDs is selected by the controller to produce a light spectrum exhibiting a fourth color temperature tunable between the first and third color temperatures.

10. The horticultural system of claim 9, wherein the single row of fixed-color LEDs includes a row of blue LEDs.

11. The horticultural system of claim 10, wherein the single row of fixed-color LEDs includes a row of blue LEDs that emit light having 440 nm and 460 nm wavelengths.

12. The horticultural system of claim 11, wherein a first portion of the blue LEDs emit light having a 440 nm wavelength and a second portion of the blue LEDs emit light having a 460 nm wavelength.

13. The horticultural system of claim 12, wherein the first portion includes a first half of the blue LEDs and the second portion includes a second half of the blue LEDs.

14. The horticultural system of claim 9, wherein the single row of fixed-color LEDs includes a row of red LEDs.

15. The horticultural system of claim 14, wherein a first portion of the red LEDs emit light having a 625 nm wavelength and a second portion of the red LEDs emit light having a 660 nm wavelength.

16. The horticultural system of claim 15, wherein the first portion includes a first half of the red LEDs and the second portion includes a second half of the red LEDs.

17. The horticultural system of claim 9, further comprising a light prescription database coupled to the controller, wherein the controller is configured to access the light prescription database to determine the fourth color temperature.

18. The horticultural system of claim 17, further comprising a quantum sensor coupled to the controller to provide measurements indicative of the fourth color temperature, wherein the controller is configured to control an intensity of the plurality of rows of LEDs to maintain the fourth color temperature within constraints defined by the light prescription database.

19. A horticultural system, comprising:
a light including multiple channels of LEDs;
a controller coupled to each of the multiple channels of LEDs, the controller configured to adjust an intensity of light generated by each of the multiple channels of LEDs;
a database coupled to the controller; and
a sensor coupled to the controller and configured to measure aspects of the generated light, wherein the controller adapts the intensity of each of the multiple channels of LEDs to maintain the measured aspects of the light to be within a light prescription constraint defined by the database.

20. The horticultural system of claim 19, wherein the light prescription constraint includes color temperature.

* * * * *